(12) United States Patent
Hosseini et al.

(10) Patent No.: US 11,291,026 B2
(45) Date of Patent: Mar. 29, 2022

(54) UPLINK TRANSMISSION TECHNIQUES IN LOW-LATENCY WIRELESS COMMUNICATION

(71) Applicant: QUALCOMM Incorporated, San Diego, CA (US)

(72) Inventors: Seyedkianoush Hosseini, San Diego, CA (US); Alberto Rico Alvarino, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/184,803

(22) Filed: Nov. 8, 2018

(65) Prior Publication Data
US 2019/0141729 A1 May 9, 2019

Related U.S. Application Data

(60) Provisional application No. 62/584,110, filed on Nov. 9, 2017.

(51) Int. Cl.
*H04W 72/12* (2009.01)
*H04W 72/04* (2009.01)
(Continued)

(52) U.S. Cl.
CPC ....... *H04W 72/1268* (2013.01); *H04W 52/14* (2013.01); *H04W 52/146* (2013.01);
(Continued)

(58) Field of Classification Search
CPC ........... H04W 72/1268; H04W 52/146; H04W 52/28; H04W 72/0406; H04W 76/27;
(Continued)

(56) References Cited

U.S. PATENT DOCUMENTS

2010/0202389 A1   8/2010 Cai et al.
2016/0227486 A1*  8/2016 Park .................. H04W 72/0413
(Continued)

FOREIGN PATENT DOCUMENTS

EP        3637882 A1 *  4/2020  ............ H04W 72/12
WO   WO-2018208134 A1 * 11/2018  ............ H04W 52/54

OTHER PUBLICATIONS

International Search Report and Written Opinion—PCT/US2018/060154—ISA/EPO—dated May 23, 2019 (180770WO).
(Continued)

*Primary Examiner* — Vinncelas Louis
(74) *Attorney, Agent, or Firm* — Terry Tsai

(57) ABSTRACT

Methods, systems, and devices for wireless communications are described that provide for indicating transmit power control information to a user equipment (UE) for semi-persistent scheduling (SPS) transmissions in short transmission time intervals (TTIs) from the UE, and for configuring reference signal transmissions in SPS transmissions of short TTIs. A UE may be configured with uplink power control information for SPS transmissions that use sTTIs that is separate from uplink power control for longer TTIs. A UE may receive the power control information and apply it in SPS transmissions that use sTTIs. Uplink transmit power for SPS sTTI transmissions may be independent of power control for regular sTTI transmissions and independent of power control for long TTI transmissions. UEs may apply a cyclic shift to reference signals transmitted is SPS transmissions according to a SPS configuration, rather than a cyclic shift indicated in a SPS activation command.

8 Claims, 18 Drawing Sheets

(51) Int. Cl.
  *H04W 76/27* (2018.01)
  *H04W 52/14* (2009.01)
  *H04W 52/28* (2009.01)
  *H04W 72/14* (2009.01)

(52) U.S. Cl.
  CPC ....... *H04W 52/28* (2013.01); *H04W 72/0406* (2013.01); *H04W 76/27* (2018.02); *H04W 72/0446* (2013.01); *H04W 72/14* (2013.01)

(58) Field of Classification Search
  CPC . H04W 52/14; H04W 72/14; H04W 72/0446; H04W 72/044; H04W 72/0413; H04W 72/12
  See application file for complete search history.

(56) References Cited

U.S. PATENT DOCUMENTS

| | | | |
|---|---|---|---|
| 2017/0273071 | A1 | 9/2017 | Nogami et al. |
| 2018/0077719 | A1* | 3/2018 | Nory ................. H04W 28/0278 |
| 2018/0146440 | A1* | 5/2018 | Hosseini ............... H04W 72/12 |
| 2018/0376495 | A1* | 12/2018 | Lee ................... H04W 72/1289 |
| 2019/0007248 | A1 | 1/2019 | Takeda et al. |
| 2019/0141730 | A1 | 5/2019 | Hosseini et al. |
| 2019/0166616 | A1* | 5/2019 | Liu ...................... H04W 72/044 |
| 2019/0215775 | A1* | 7/2019 | Almquist ............ H04W 52/267 |

OTHER PUBLICATIONS

"3rd Generation Partnership Project; Technical Specification Group Radio Access Network; Evolved Universal Terrestrial Radio Access (E-EUTRA); Study on Latency Reduction Techniques for LTE (Release 14)", 3GPP Standard; Technical Report; 3GPP TR 36.881, 3rd Generation Partnership Project (3GPP), Mobile Competence Centre; 650, Route Des Lucioles; F-06921 Sophia-Antipolis Cedex; France, vol. RAN WG2, No. V14.0.0, Jul. 13, 2016, XP051450161, pp. 1-99, section 8.1, section 8.2, section 8.5.

"3 Generation Partnership Project; Technical Specification Group Radio Access Network; Evolved Universal Terrestrial Radio Access (E-UTRA); Multiplexing and Channel Coding (Release 14)," 3GPP Standard; Technical Specification; 3GPP TS 36.212, 3rd Generation Partnership Project (3GPP), Mobile Competence Centre; 650, Route Des Lucioles; F-06921 Sophia-Antipolis Cedex; France, vol. RAN WG1, No. V14.4.0, Sep. 26, 2017, pp. 1-198, XP051337332, [retrieved on Sep. 26, 2017] section 5.3.3.1.6, section 5.3.3.1.7.

"3 Generation Partnership Project; Technical Specification Group Radio Access Network; Evolved Universal Terrestrial Radio Access (E-UTRA); Physical Layer Procedures (Release 14)," 3GPP Standard; Technical Specification; 3GPP TS 36.213, 3rd Generation Partnership Project (3GPP), Mobile Competence Centre; 650, Route Des Lucioles; F-06921, Sophia-Antipolis Cedex; France, vol. RAN WG1, No. V14.4.0, Sep. 26, 2017, pp. 8-49, XP051337377, [retrieved on Sep. 26, 2017], section 5.1.1.1, section 5.1.2.1.

NTT DOCOMO, et al: "Uplink Power Control for sTTI," 3GPP Draft; R1-1708423, 3rd Generation Partnership Project (3GPP), Mobile Competence Centre; 650, Route Des Lucioles; F-06921 Sophia-Antipolis Cedex; France, vol. RAN WG1, No. Hangzhou; 20170515-20170519, May 14, 2017, XP051273616, 4 pages, Retrieved from the Internet: URL: http://www.3gpp.org/ftp/Meetings_3GPP_SYNC/RAN1/Docs/[retrieved on May 14, 2017], section 2.

Partial International Search Report—PCT/US2018/060154—ISA/EPO—dated Mar. 28, 2019 (180770WO).

* cited by examiner

UPLINK TRANSMISSION TECHNIQUES IN LOW-LATENCY WIRELESS COMMUNICATION

CROSS REFERENCES

The present application for patent claims the benefit of U.S. Provisional Patent Application No. 62/584,110 by HOSSEINI et al., entitled "UPLINK TRANSMISSION TECHNIQUES IN LOW-LATENCY WIRELESS COMMUNICATION," filed Nov. 9, 2017, assigned to the assignee hereof, and expressly incorporated herein by reference in its entirety.

BACKGROUND

The present disclosure relates generally to wireless communication, and more specifically to uplink transmission techniques in low-latency wireless communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In multiple-access systems, such as TDMA and OFDMA systems, wireless communication resources may be partitioned into time intervals (e.g., symbol periods, slots, subframes, etc.) in the time domain and into frequency bands (e.g., sub-bands, bands, etc.) in the frequency domain. The partitioned communication resources may be referred to as a resource map. In some cases, the time intervals (e.g., subframe number, system frame number, etc.) and frequency bands are associated with numerical identifiers, which may be used to identify particular communication resources within a resource map. For instance, a base station may use the numerical identifiers when scheduling particular communication resources for one or more particular UEs. In some cases, a minimum scheduling interval, which may be referred to as a time transmission interval (TTI), is used when scheduling communication resources in a wireless communications system. For instance, a subframe may be an example of a minimum scheduling interval, and a base station may schedule a UE to receive or transmit information over communication resources that span one or more subframes.

In some examples, a first set of UEs may communicate with a base station using TTIs of one length, while a second set of UEs may communicate with the base station using TTIs of a different length. For instance, a base station may communicate low-latency information to the first set of UEs using short TTIs (sTTIs) (e.g., TTIs spanning two or three symbol periods), and may communicate non-low-latency information to the second set of UEs using long TTIs (e.g., TTIs spanning 14 symbol periods).

In some cases, semi-persistent scheduling (SPS) may be used to schedule uplink transmissions from one or more UEs in cases where relatively small packets may be transmitted at regular periodic intervals. In some cases, it may be desirable to use SPS in conjunction with sTTIs.

SUMMARY

The described techniques relate to improved methods, systems, devices, or apparatuses that support uplink transmission techniques in low-latency wireless communication. Various described techniques provide for indicating transmit power control information to a user equipment (UE) for semi-persistent scheduling (SPS) transmissions in short transmission time intervals (TTIs) from the UE, and for configuring reference signal transmissions in SPS transmissions of short TTIs (sTTIs). In some cases, a UE may be configured with uplink power control information for SPS transmissions that use sTTIs that is separate from uplink power control for longer TTIs (e.g., 1 ms TTIs). A UE may receive the power control information and apply it in SPS transmissions that use sTTIs. In some cases, uplink transmit power for SPS sTTI transmissions may be independent of power control for regular sTTI transmissions (e.g., sTTI transmissions that are scheduled through grants provided in downlink control information (DCI) for a TTI rather than being scheduled through SPS) and independent of power control for long TTI transmissions.

In some cases, a base station may configure a UE for SPS transmissions using sTTIs, and the configuration information may include an indication of where sTTI SPS power control information may be located, as well as information for reference signal transmissions (e.g., demodulation reference signal (DMRS) transmissions) that are transmitted in the SPS sTTIs. In some cases, the reference signal information may include a cyclic shift that is to be applied to the transmitted reference signal, which may allow the base station to allocate overlapping resources to two or more UEs. In some cases, the configuration information may include an index value for a UE that identifies a location of power control information in DCI that may be transmitted to a number of different UEs.

A method of wireless communication is described. The method may include receiving an SPS activation for transmitting uplink transmissions in a first plurality of TTIs, wherein the first plurality of TTIs have a first TTI duration that is shorter than a second TTI duration of a second plurality of TTIs, receiving, during a first TTI of the second plurality of TTIs, first uplink power control information for setting a first uplink transmission power for at least one TTI of the first plurality of TTIs, and second uplink power control information for setting a second uplink transmission power for at least one TTI of the second plurality of TTIs, setting the first uplink power for the at least one TTI of the first plurality of TTIs, and transmitting the at least one TTI of the first plurality of TTIs according to an SPS grant using the first uplink power.

An apparatus for wireless communication is described. The apparatus may include means for receiving an SPS activation for transmitting uplink transmissions in a first plurality of TTIs, wherein the first plurality of TTIs have a first TTI duration that is shorter than a second TTI duration of a second plurality of TTIs, means for receiving, during a first TTI of the second plurality of TTIs, first uplink power control information for setting a first uplink transmission power for at least one TTI of the first plurality of TTIs, and second uplink power control information for setting a second uplink transmission power for at least one TTI of the second plurality of TTIs, means for setting the first uplink power for the at least one TTI of the first plurality of TTIs, and means for transmitting the at least one TTI of the first plurality of TTIs according to an SPS grant using the first uplink power.

Another apparatus for wireless communication is described. The apparatus may include a processor, memory in electronic communication with the processor, and instructions stored in the memory. The instructions may be operable to cause the processor to receive an SPS activation for transmitting uplink transmissions in a first plurality of TTIs, wherein the first plurality of TTIs have a first TTI duration that is shorter than a second TTI duration of a second plurality of TTIs, receive, during a first TTI of the second plurality of TTIs, first uplink power control information for setting a first uplink transmission power for at least one TTI of the first plurality of TTIs, and second uplink power control information for setting a second uplink transmission power for at least one TTI of the second plurality of TTIs, set the first uplink power for the at least one TTI of the first plurality of TTIs, and transmit the at least one TTI of the first plurality of TTIs according to an SPS grant using the first uplink power.

A non-transitory computer-readable medium for wireless communication is described. The non-transitory computer-readable medium may include instructions operable to cause a processor to receive an SPS activation for transmitting uplink transmissions in a first plurality of TTIs, wherein the first plurality of TTIs have a first TTI duration that is shorter than a second TTI duration of a second plurality of TTIs, receive, during a first TTI of the second plurality of TTIs, first uplink power control information for setting a first uplink transmission power for at least one TTI of the first plurality of TTIs, and second uplink power control information for setting a second uplink transmission power for at least one TTI of the second plurality of TTIs, set the first uplink power for the at least one TTI of the first plurality of TTIs, and transmit the at least one TTI of the first plurality of TTIs according to an SPS grant using the first uplink power.

In some examples of the method, apparatus, and non-transitory computer-readable medium described herein, the first uplink power control information and the second uplink power control information are transmitted in DCI. Some examples of the method, apparatus, and non-transitory computer-readable medium described herein may further include processes, features, means, or instructions for receiving an index value for identifying the first uplink power control information from a plurality of different power control information provided in the first TTI of the second plurality of TTIs. In some examples of the method, apparatus, and non-transitory computer-readable medium described herein, the index value may be received in a configuration information element via radio resource control (RRC) signaling.

In some examples of the method, apparatus, and non-transitory computer-readable medium described herein, the uplink power control for the first plurality of TTIs may be performed independently of uplink power control for the second plurality of TTIs. In some examples of the method, apparatus, and non-transitory computer-readable medium described herein, the uplink power control for the first plurality of TTIs may be performed independently of uplink power control for a third plurality of TTIs that may have the first TTI duration. In some examples of the method, apparatus, and non-transitory computer-readable medium described herein, the at least one TTI of the first plurality of TTIs may be transmitted using the first uplink power in a subframe that may be a next consecutive subframe following the receiving of the first uplink power control information.

A method of wireless communication is described. The method may include transmitting, to a UE, an SPS activation for transmitting uplink transmissions in a first plurality of TTIs, wherein the first plurality of TTIs have a first TTI duration that is shorter than a second TTI duration of a second plurality of TTIs, determining first uplink power control information for setting a first uplink transmission power at the UE for at least one TTI of the first plurality of TTIs, and second uplink power control information for setting a second uplink transmission power for at least one TTI of the second plurality of TTIs, and transmitting, during a first TTI of the second plurality of TTIs, the first uplink power control information and the second uplink power control information to the UE.

An apparatus for wireless communication is described. The apparatus may include means for transmitting, to a UE, an SPS activation for transmitting uplink transmissions in a first plurality of TTIs, wherein the first plurality of TTIs have a first TTI duration that is shorter than a second TTI duration of a second plurality of TTIs, means for determining first uplink power control information for setting a first uplink transmission power at the UE for at least one TTI of the first plurality of TTIs, and second uplink power control information for setting a second uplink transmission power for at least one TTI of the second plurality of TTIs, and means for transmitting, during a first TTI of the second plurality of TTIs, the first uplink power control information and the second uplink power control information to the UE.

Another apparatus for wireless communication is described. The apparatus may include a processor, memory in electronic communication with the processor, and instructions stored in the memory. The instructions may be operable to cause the processor to transmit, to a UE, an SPS activation for transmitting uplink transmissions in a first plurality of TTIs, wherein the first plurality of TTIs have a first TTI duration that is shorter than a second TTI duration of a second plurality of TTIs, determine first uplink power control information for setting a first uplink transmission power at the UE for at least one TTI of the first plurality of TTIs, and second uplink power control information for setting a second uplink transmission power for at least one TTI of the second plurality of TTIs, and transmit, during a first TTI of the second plurality of TTIs, the first uplink power control information and the second uplink power control information to the UE.

A non-transitory computer-readable medium for wireless communication is described. The non-transitory computer-readable medium may include instructions operable to cause a processor to transmit, to a UE, an SPS activation for transmitting uplink transmissions in a first plurality of TTIs, wherein the first plurality of TTIs have a first TTI duration that is shorter than a second TTI duration of a second plurality of TTIs, determine first uplink power control information for setting a first uplink transmission power at the UE for at least one TTI of the first plurality of TTIs, and second uplink power control information for setting a second uplink transmission power for at least one TTI of the second plurality of TTIs, and transmit, during a first TTI of the second plurality of TTIs, the first uplink power control information and the second uplink power control information to the UE.

In some examples of the method, apparatus, and non-transitory computer-readable medium described herein, the first uplink power control information and the second uplink power control information may be transmitted in DCI.

Some examples of the method, apparatus, and non-transitory computer-readable medium described herein may further include processes, features, means, or instructions for configuring the UE with an index value for identifying the first uplink power control information from a plurality of different power control information provided in the first TTI of the second plurality of TTIs. In some examples of the method, apparatus, and non-transitory computer-readable medium described herein, the index value may be transmitted to the UE in a configuration information element via RRC signaling.

In some examples of the method, apparatus, and non-transitory computer-readable medium described herein, the uplink power control for the first plurality of TTIs may be performed independently of uplink power control for the second plurality of TTIs. In some examples of the method, apparatus, and non-transitory computer-readable medium described herein, the uplink power control for the first plurality of TTIs may be performed independently of uplink power control for a third plurality of TTIs that may have the first TTI duration.

A method of wireless communication is described. The method may include receiving, at a UE, an SPS configuration for transmitting uplink transmissions in a first plurality of TTIs, wherein the first plurality of TTIs have a first TTI duration that is shorter than a second TTI duration of a second plurality of TTIs, and wherein the SPS configuration indicates configuration information that is to be applied to a DMRS transmitted in one or more of the first plurality of TTIs and the SPS configuration includes configuration information, receiving, during a first TTI of the second plurality of TTIs, an activation command to activate the SPS, formatting a DMRS for transmission in one of more of the first plurality of TTIs responsive to the activation command, configuring, in accordance with the configuration information, a DMRS for transmission in one or more of the first plurality of TTIs responsive to the activation command, and transmitting the configured DMRS in at least one of the first plurality of TTIs.

An apparatus for wireless communication is described. The apparatus may include means for receiving, at a UE, an SPS configuration for transmitting uplink transmissions in a first plurality of TTIs, wherein the first plurality of TTIs have a first TTI duration that is shorter than a second TTI duration of a second plurality of TTIs, and wherein the SPS configuration indicates configuration information that is to be applied to a DMRS transmitted in one or more of the first plurality of TTIs, means for receiving, during a first TTI of the second plurality of TTIs, an activation command to activate the SPS, means for formatting a DMRS for transmission in one of more of the first plurality of TTIs responsive to the activation command, means for configuring, in accordance with the configuration information, a DMRS for transmission in one or more of the first plurality of TTIs responsive to the activation command, and means for transmitting the configured DMRS in at least one of the first plurality of TTIs.

Another apparatus for wireless communication is described. The apparatus may include a processor, memory in electronic communication with the processor, and instructions stored in the memory. The instructions may be operable to cause the processor to receive, at a UE, an SPS configuration for transmitting uplink transmissions in a first plurality of TTIs, wherein the first plurality of TTIs have a first TTI duration that is shorter than a second TTI duration of a second plurality of TTIs, and wherein the SPS configuration indicates configuration information that is to be applied to a DMRS transmitted in one or more of the first plurality of TTIs, receive, during a first TTI of the second plurality of TTIs, an activation command to activate the SPS, format a DMRS for transmission in one of more of the first plurality of TTIs responsive to the activation command, configure, in accordance with the configuration information, a DMRS for transmission in one or more of the first plurality of TTIs responsive to the activation command, and transmit the configured DMRS in at least one of the first plurality of TTIs.

A non-transitory computer-readable medium for wireless communication is described. The non-transitory computer-readable medium may include instructions operable to cause a processor to receive, at a UE, an SPS configuration for transmitting uplink transmissions in a first plurality of TTIs, wherein the first plurality of TTIs have a first TTI duration that is shorter than a second TTI duration of a second plurality of TTIs, and wherein the SPS configuration indicates configuration information that is to be applied to a DMRS transmitted in one or more of the first plurality of TTIs, receive, during a first TTI of the second plurality of TTIs, an activation command to activate the SPS, format a DMRS for transmission in one of more of the first plurality of TTIs responsive to the activation command, configure, in accordance with the configuration information, a DMRS for transmission in one or more of the first plurality of TTIs responsive to the activation command, and transmit the configured DMRS in at least one of the first plurality of TTIs.

In some examples of the method, apparatus, and non-transitory computer-readable medium described herein, the multiple UEs may be configured with non-orthogonal SPS resources. In some examples of the method, apparatus, and non-transitory computer-readable medium described herein, the activation command includes a field indicating a DMRS cyclic shift that may be ignored when applying the cyclic shift. In some examples of the method, apparatus, and non-transitory computer-readable medium described herein, the DMRS cyclic shift indicated in the activation command may be used to enhance reliability of the activation command and reduce a false alarm rate (FAR) for the activation command. In some examples of the method, apparatus, and non-transitory computer-readable medium described herein, the activation command may be received in DCI from a base station. In some examples of the method, apparatus, and non-transitory computer-readable medium described herein, the DCI may have a predetermined DCI format for activating the SPS.

In some examples of the method, apparatus, and non-transitory computer-readable medium described herein, the activation command may be confirmed by verifying that a cyclic redundancy check (CRC) of the activation command may be scrambled by a SPS identification that may be configured at the UE, and that one or more fields of the DCI, including a DMRS cyclic shift field, may be set to predetermined pattern of values.

A method of wireless communication is described. The method may include transmitting, to a UE, an SPS configuration for uplink transmissions from the UE in a first plurality of TTIs, wherein the first plurality of TTIs have a first TTI duration that is shorter than a second TTI duration of a second plurality of TTIs, and wherein the SPS configuration includes a cyclic shift that is to be applied to a DMRS transmitted in one or more of the first plurality of TTIs, transmitting, during a first TTI of the second plurality of TTIs, an activation command to the UE to activate the SPS, receiving one or more uplink transmissions in the first plurality of TTIs, the one or more uplink transmissions including a DMRS transmission, processing the DMRS in accordance with the configuration information, and decoding the one or more uplink transmissions based at least in part on the processed DMRS.

An apparatus for wireless communication is described. The apparatus may include means for transmitting, to a UE, an SPS configuration for uplink transmissions from the UE in a first plurality of TTIs, wherein the first plurality of TTIs have a first TTI duration that is shorter than a second TTI duration of a second plurality of TTIs, and wherein the SPS configuration includes a cyclic shift that is to be applied to a DMRS transmitted in one or more of the first plurality of TTIs, means for transmitting, during a first TTI of the second plurality of TTIs, an activation command to the UE to activate the SPS, means for receiving one or more uplink transmissions in the first plurality of TTIs, the one or more uplink transmissions including a DMRS transmission, means for processing the DMRS in accordance with the configuration information, and means for decoding the one or more uplink transmissions based at least in part on the processed DMRS.

Another apparatus for wireless communication is described. The apparatus may include a processor, memory in electronic communication with the processor, and instructions stored in the memory. The instructions may be operable to cause the processor to transmit, to a UE, an SPS configuration for uplink transmissions from the UE in a first plurality of TTIs, wherein the first plurality of TTIs have a first TTI duration that is shorter than a second TTI duration of a second plurality of TTIs, and wherein the SPS configuration indicates configuration information that is to be applied to a DMRS transmitted in one or more of the first plurality of TTIs, transmit, during a first TTI of the second plurality of TTIs, an activation command to the UE to activate the SPS, receive one or more uplink transmissions in the first plurality of TTIs, the one or more uplink transmissions including a DMRS transmission, process the DMRS in accordance with the configuration information, and decode the one or more uplink transmissions based at least in part on the processed DMRS. In some cases, the configuration may be determined for which DMRS and/or cyclic shift for the DMRS may be used. In this case, the UE may disregard the bit field in the DCI and may instead utilize the determined configuration.

A non-transitory computer-readable medium for wireless communication is described. The non-transitory computer-readable medium may include instructions operable to cause a processor to transmit, to a UE, an SPS configuration for uplink transmissions from the UE in a first plurality of TTIs, wherein the first plurality of TTIs have a first TTI duration that is shorter than a second TTI duration of a second plurality of TTIs, and wherein the SPS configuration indicates configuration information that is to be applied to a DMRS transmitted in one or more of the first plurality of TTIs, transmit, during a first TTI of the second plurality of TTIs, an activation command to the UE to activate the SPS, receive one or more uplink transmissions in the first plurality of TTIs, the one or more uplink transmissions including a DMRS transmission, process the DMRS in accordance with the configuration information for transmission in one or more of the first plurality of TTIs responsive to the activation command, and decode the one or more uplink transmissions based at least in part on the processed DMRS.

In some examples of the method, apparatus, and non-transitory computer-readable medium described herein, the multiple UEs may be configured with non-orthogonal SPS resources. In some examples of the method, apparatus, and non-transitory computer-readable medium described herein, the activation command includes a field indicating a DMRS cyclic shift that may be ignored by the UE when applying the cyclic shift to the DMRS.

DETAILED DESCRIPTION

Figure 1:
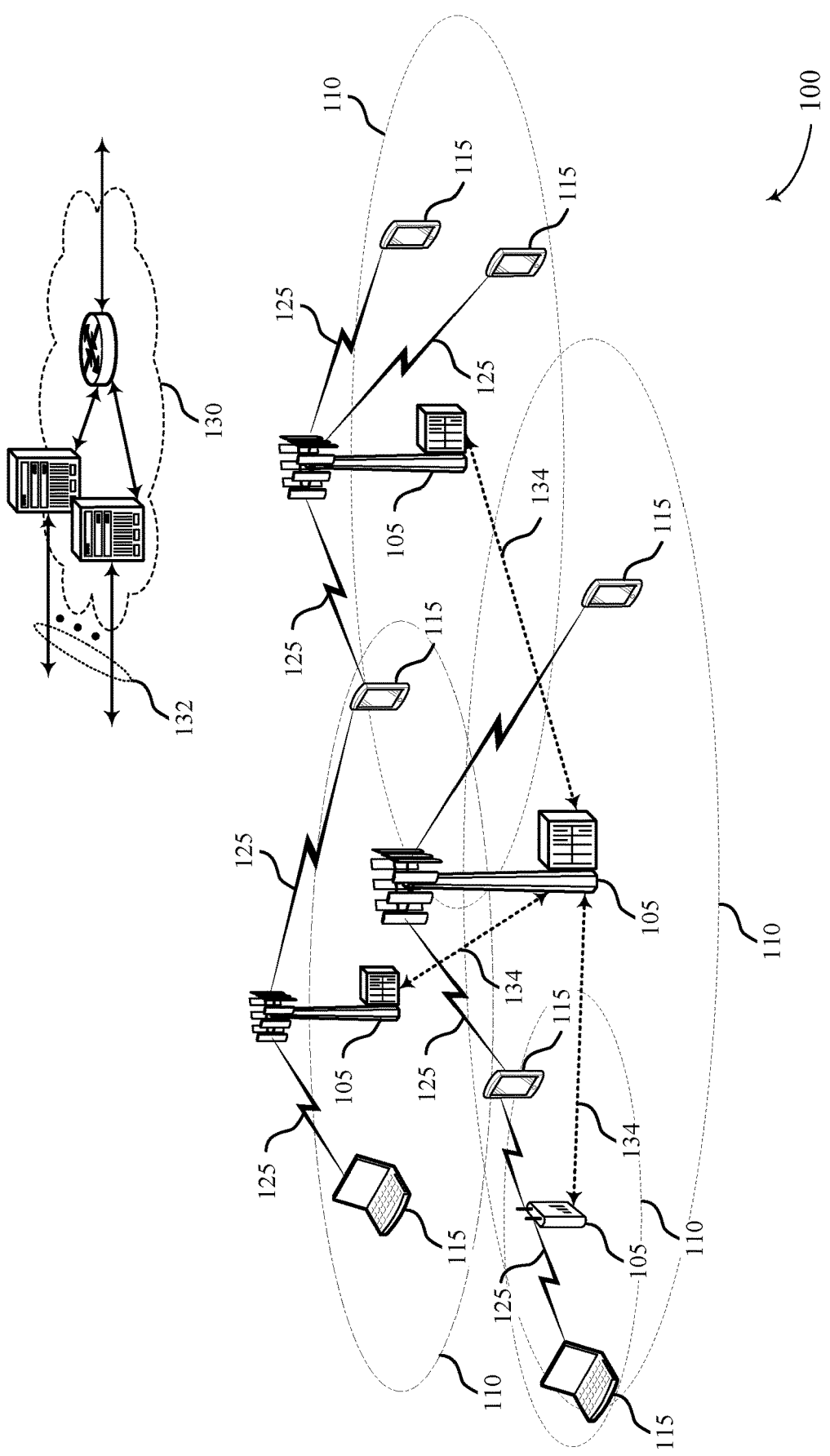
FIG. 1 illustrates an example of a system for wireless communication that supports uplink transmission techniques in low-latency wireless communication in accordance with aspects of the present disclosure.

A base station and user equipment (UE) may communicate with one another using transmission time intervals (TTI)s of a first duration (e.g., 1 ms) (or "non-low-latency TTIs" or "long TTIs") as a minimum scheduling interval. Accordingly, the base station and UE may configure communication processes, such as semi-persistent scheduling (SPS), based on the minimum scheduling interval—e.g., may use reference resources and power control that span the minimum scheduling interval with a periodicity that supports a latency corresponding to the minimum scheduling interval. In some cases, a base station and UE may also communicate with one another using TTIs of a second duration, which may be shorter than the first duration, as a minimum scheduling interval. In some cases, a TTI of the second duration may be referred to as a "low-latency TTI" or a "short TTI" (also known as an sTTI), and may be a 1 orthogonal frequency division multiplexing (OFDM) symbol TTI (which may be 71.4 μs in length), a 2 OFDM symbol TTI (which may be 142.8 μs in length), a 3 OFDM symbol TTI (which may be 214.3 μs in length), or a 7 OFDM symbol TTI (which may be 0.5 ms in length and also referred to as a slot TTI)). In some cases, communication processes that support communications using TTIs of the first duration fail to support or result in degraded performance for communications using low-latency TTIs.

Thus, enhanced power management and reference signal transmission techniques may be used, according to various aspects of the present disclosure, to provide power control and reference signal transmission when SPS is used for sTTIs. In some cases, a UE may be configured with uplink power control information for SPS transmissions that use sTTIs that is separate from uplink power control for long TTIs. A UE may receive the power control information and apply it in SPS transmissions that use sTTIs. In some cases, uplink transmit power for SPS sTTI transmissions may be independent of power control for regular sTTI transmissions (e.g., sTTI transmissions that are scheduled through grants provided in downlink control information for a TTI rather than being scheduled through SPS) and independent of power control for long TTI transmissions.

In some cases, a base station may configure a UE for SPS transmissions using sTTIs, and the configuration information may include an indication of where sTTI SPS power control information may be located, as well as information for reference signal transmissions (e.g., demodulation reference signal (DMRS) transmissions) that are transmitted in the SPS sTTIs. In some cases, the reference signal information may include a cyclic shift that is to be applied to the transmitted reference signal, which may allow the base station to allocate overlapping resources to two or more UEs. In some cases, the configuration information may include an index value for a UE that identified a location of power control information in downlink control information (DCI) that may be transmitted to a number of different UEs.

Aspects of the disclosure are initially described in the context of a wireless communications system. Aspects of the disclosure are further illustrated by and described with reference to apparatus diagrams, system diagrams, and flowcharts that relate to uplink transmission techniques in low-latency wireless communication.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low-latency communications, or communications with low-cost and low-complexity devices. In accordance with aspects of the present disclosure, the wireless communications system 100 may support SPS transmissions that use sTTIs.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a wireless communication terminal, a terminal, a phone, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may utilize both licensed and unlicensed radio frequency spectrum bands. The unlicensed spectrum may include frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels.

The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

A base station and UE may communicate with one another using TTIs of a first duration (e.g., 1ms) (or "non-low-latency TTIs" or "long TTIs") as a minimum scheduling interval. Accordingly, the base station and UE may configure communication processes, such as SPS, based on the minimum scheduling interval—e.g., may use reference resources and power control that span the minimum scheduling interval with a periodicity that supports a latency corresponding to the minimum scheduling interval. In some cases, a base station and UE may also communicate with one another using TTIs of a second duration, which may be shorter than the first duration, as a minimum scheduling interval. In some cases, a TTI of the second duration may be referred to as a "low-latency TTI" or a "short TTI" (also known as an sTTI), and may be a 1 orthogonal frequency division multiplexing (OFDM) symbol TTI (which may be 71.4 µs in length), a 2 OFDM symbol TTI (which may be 142.8 µs in length), a 3 OFDM symbol TTI (which may be 214.3 µs in length), or a 7 OFDM symbol TTI (which may be 0.5 ms in length and also referred to as a slot TTI)).

Low-latency TTI or sTTI operations may have the issue of not having a common search space, hence when SPS is activated, there may not be sTTI-specific mechanisms for power control in the UL. Additionally, another issue may be that communication processes that support communications using TTIs of the first duration fail to support communications using low-latency TTIs. Furthermore, communication processes that support communications using TTIs of the first duration may result in degraded performance for communications using low-latency TTIs. Thus, enhanced power management and reference signal transmission techniques may be used, according to various aspects of the present disclosure, to provide power control and reference signal transmission when SPS is used for sTTIs. In some cases, the power control command for both TTIs and sTTIs under SPS may be transmitted using the format 3/3A. This may apply to PUCCH/PUSCH and SPUCCH/sTTI PUSCH separately. Additionally, the indices may be different for UL control and UL data under SPS.

To solve the lack of sTTI-specific mechanisms for power control when SPS is activated, a UE may be configured with uplink power control for SPS transmissions that use sTTIs that is separate from uplink power control for long TTIs. A UE may receive the power control information and apply it in SPS transmissions that use sTTIs. Beneficially, uplink transmit power for SPS sTTI transmissions may be independent of power control for regular sTTI transmissions (e.g., sTTI transmissions that are scheduled through grants provided in DCI for a TTI rather than being scheduled through SPS) and independent of power control for long TTI transmissions. The power control information and may be transmitted in DCI.

In one example, a solution to the lack of sTTI-specific mechanisms when SPS is activated, may include a UE 115 and base station 105 which may communicate using TTIs of a first size or duration and TTIs of a second size or duration. In some examples, SPS may be used to schedule sTTI transmissions at a UE 115. In some cases, uplink power control information for SPS transmissions that use sTTIs may be separate from uplink power control for long TTIs and for regularly scheduled sTTIs. In some cases, a base station 105 may configure a UE 115 for SPS transmissions using sTTIs, and the configuration information may include an indication of where sTTI SPS power control information may be located within a DCI transmission that is transmitted using a long TTI, as well as information for reference signal transmissions (e.g., DMRS transmissions) that are transmitted in the SPS sTTIs. In some cases, the reference signal information may include a cyclic shift that is to be applied to the transmitted reference signal, which may allow the base station to allocate overlapping resources to two or more UEs 115. In some cases, the configuration information may include an index value for a UE 115 that identifies a location of power control information in DCI that may be transmitted to a number of different UEs 115.

In some cases, the UE may receive an SPS configuration for transmitting UL transmission in an sTTI and the SPS configuration may indicate configuration information that is to be applied to the DMRS that is to be transmitted in the sTTI. The UE may receive, during the sTTI, an activation command to activate the SPS configuration and configure, in accordance with the configuration information, the DMRS, for transmission in the sTTIs responsive to the activation command.

In some examples, the reference signal information may include a cyclic shift that is to be applied to the transmitted reference signal, which may allow the base station to allocate overlapping resources to two or more UEs 115. This solution may allow for contention based UL transmission while keeping false alarm rates (FARs) low, where the DMRS cyclic shift field may be set in fixed manner, but the DMRS for cyclic shift for each UC may be given as part of its SPS configuration, accordingly. In some cases, the configuration information may include an index value for a UE 115 that identifies a location of power control information in DCI that may be transmitted to a number of different UEs 115.

In some cases, a base station may configure a UE for SPS transmissions using sTTIs, and the configuration information may include an indication of where sTTI SPS power control information may be located, as well as information for reference signal transmissions (e.g., DMRS transmissions) that are transmitted in the SPS sTTIs. In some cases, the reference signal information may include configuration information. In some cases, the configuration information may include an index value for a UE that identified a location of power control information in DCI that may be transmitted to a number of different UEs. In other cases, the reference signal information may include a cyclic shift that is to be applied to the transmitted reference signal, which may allow the base station to allocate overlapping resources to two or more UEs.

Figure 2:
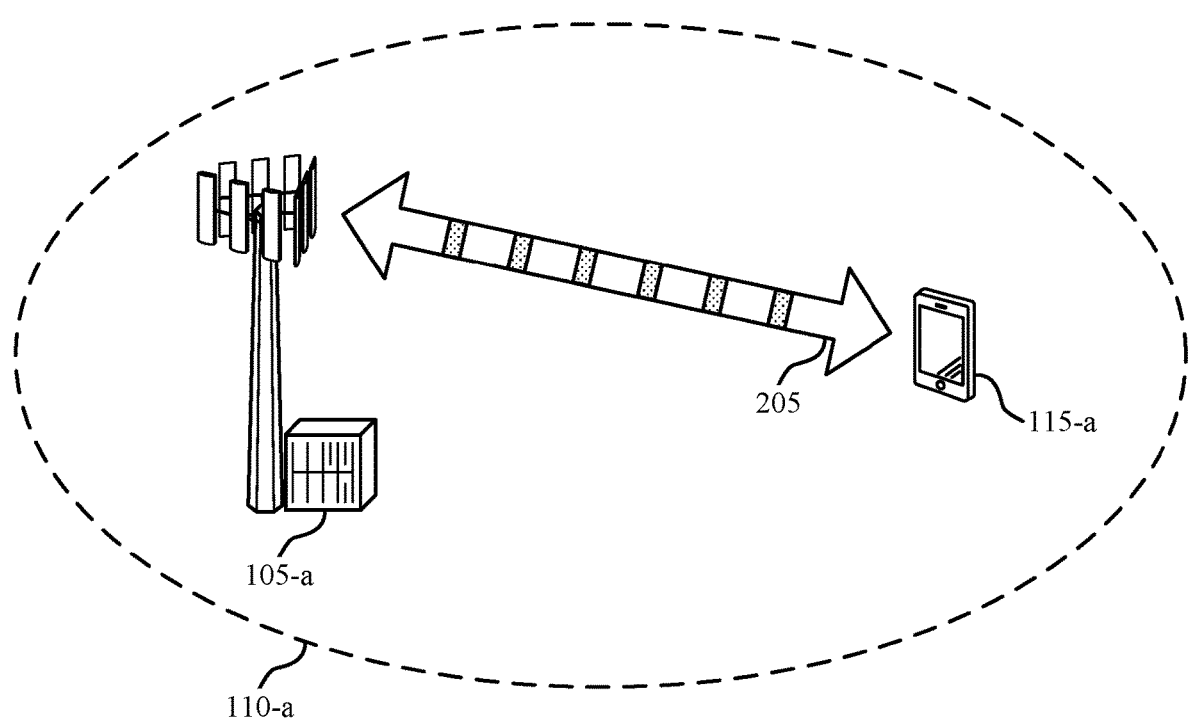
FIG. 2 illustrates an example of a wireless communication subsystem that supports uplink transmission techniques in low-latency wireless communication in accordance with aspects of the present disclosure.
Figure 2:

FIG. 2 illustrates an example of a wireless communication subsystem 200 that supports uplink transmission techniques in low-latency wireless communication in accordance with various aspects of the present disclosure. In some examples, wireless communication subsystem 200 may implement aspects of wireless communication system 100. In the example of FIG. 2, the wireless communication subsystem 200 may include a base station 105-a, which may be an example of a base station 105 of FIG. 1. The wireless communication subsystem 200 may also include a UE 115-a, which may be an example of a UE 115 of FIG. 1, that is located within coverage area 110-a of the base station 105-a.

In the example of FIG. 2, the base station 105-a and the UE 115-a may establish a connection 205. In some cases, the base station 105-a may configure the UE 115-a for SPS transmissions that may use periodic SPS resources 210. As indicated herein, SPS may be used for supporting services (e.g., voice over Internet protocol (VoIP) services, services of certain equipment that may transmit in a scheduled periodic basis, etc.) where the packet sizes are relatively small, and inter-arrival times are constant. To support such services, it is wasteful to send a grant of resources using physical downlink control channel (PDCCH) transmissions for each transmission, and thus SPS may be configured which may avoid separately transmitting a resource grant and associated information for each transmission. When the UE 115-a is configured with SPS, certain parameters such as a SPS radio network temporary identifier (RNTI), a number of HARQ processes, periodicity, etc., are indicated via RRC signaling as part of the SPS configuration. The UE 115-a may then be explicitly activated via a PDCCH whose CRC is scrambled by the UE 115-a SPS-RNTI.

In some deployments, certain DCI formats may be used to configure and activate SPS (e.g., in LTE, Format 0 may be used to activate/release SPS in UL, Format 1/1A/2/2A/2B/2C/2D can be used to activate SPS in the DL, and format 1A can be used to release SPS in the DL). In some cases, for activation/release validation, there are certain parameters in the DCI content that should be set in a specific manner such that certain fields have a predefined pattern of values which may decrease a FAR for the activation/release. In some cases, SPS can only be activated on the Pcell. For SPS transmissions using long TTIs, transmit power control for the physical uplink control channel (PUCCH) in the downlink grant is used for PUCCH resource allocation, and the PUCCH and PUSCH powers may be controlled by the power commands in certain types of DCI (which may operate as the closed-loop power control). In some LTE deployments, the parameter tpc-Index may be configured for each UE by RRC as part of the TPC-PDCCH-Config information element (IE) and used to find the power control command within the bit string.

In various aspects of the present disclosure, SPS may be provided for sTTI transmissions. However, DCI associated with a particular sTTI may not have a common search space, and thus when SPS is activated, there is no sTTI-specific mechanism for power control in the UL as there would be for long TTI SPS activation. In some cases, the UE 115-a may rely on power control commands sent in the PDCCH common search space via DCI in a long TTI PDCCH transmission. In some cases, power control for SPS transmissions may be performed independently of power control for non-SPS transmissions and long TTI transmissions. In order to accomplish such SPS sTTI power control, one or more parameters may be included in a PDCCH DCI transmission that indicates the SPS sTTI power control. In some examples, one or more parameters may be included in a TPC-PDCCH-Config IE. For example, a parameter tpc-Index-sTTI may be added into the TPC-PDCCH-Config IE, which is used to obtain the power control command for a given UE within the command string within the payload of one or more defined DCI formats (e.g., DCI format 3/3A).

Once sTTI based SPS is activated, the UE 115-a may monitor the common search space of every subframe, and if detected, modify its SPS sPUCCH/sPUSCH power according to an established power control command (e.g., the power control command in DCI format 3/3A). In such a manner, power control for SPS transmissions using sTTIs may be communicated and the UE 115-a may transmit uplink transmissions according to the appropriate power control for the transmission type (e.g., SPS or non-SPS transmissions) and TTI duration. In some cases, the UE 115-a may apply power control in a next consecutive subframe after receiving the DCI. This may differ from other procedures as in other examples, if a power control command is received in subframe n, the command may be applied to subframe n+4 as opposed to a defined number of subframes later. In one example, the defined number of subframes may be one subframe after receiving the DCI (e.g., the next subframe after receiving the DCI). In some examples, the command may be applied to any number of subframes after receiving the DCI. In some cases, the DCI may be transmitted in the legacy PDCCH region.

In some cases, the base station 105-a may also provide the UE 115-a with information for transmitting reference signal in SPS transmissions using sTTIs (e.g., DMRS transmissions). In some cases, the reference signal information may include a cyclic shift that is to be applied to the transmitted reference signal, which may allow the base station to allocate overlapping resources to two or more UEs for SPS transmissions.

Figure 3:
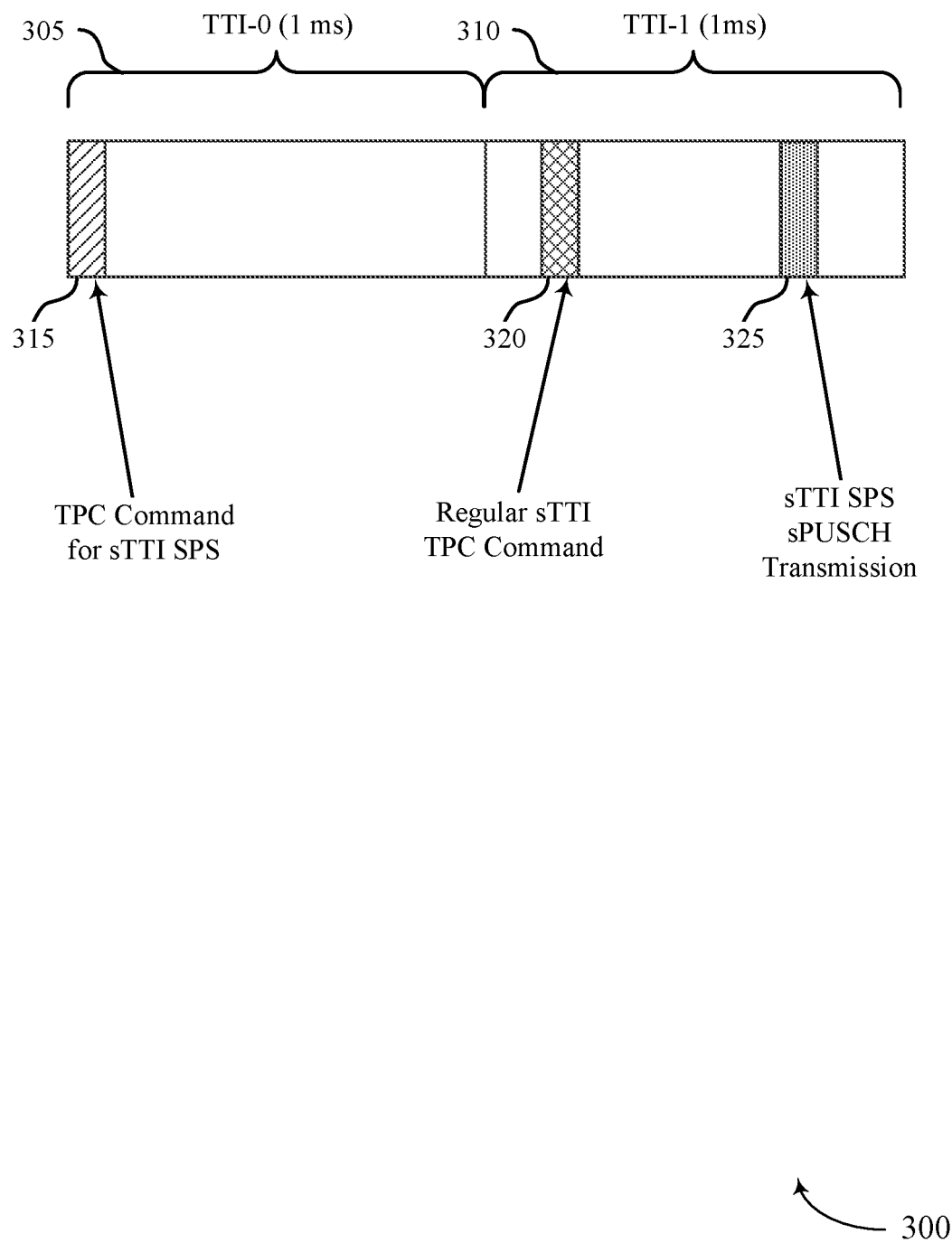
FIG. 3 illustrates an example of wireless resources that support uplink transmission techniques in low-latency wireless communication in accordance with aspects of the present disclosure.

FIG. 3 illustrates an example of wireless resources 300 that support uplink transmission techniques in low-latency wireless communication in accordance with various aspects of the present disclosure. In some examples, wireless resources 300 may implement aspects of wireless communication system 100. In this case, wireless resources 300 may span two 1 ms TTIs, namely TTI-0 305 and TTI-1 310. The base station may transmit a transmit power control (TPC) for sTTI SPS 315. In some cases, the closed-loop power control mechanism for the scheduling based sPUSCH/sPUCCH and SPS based sPUSCH/sPUCCH may be kept separated, and a regular sTTI TPC command 320 may be transmitted. The UE may transmit sTTI SPS sPUSCH transmission 325 based on the TPC command 315.

As mentioned herein, in some cases, uplink SPS may be activated via a DCI format (e.g., DCI format 0). Accordingly, in some cases, power control commands received via DCI formats 3/3A may be applied to UL SPS. In some cases, the activating DCI is valid if (1) its CRC is scrambled by SPS-CRNTI, (2) NDI is set to 0, and (3) the special SPS activation PDCCH validation are set according to predetermined patterns. In some cases, one of the fields is a cyclic shift for DMRS and is set to 000. Because of this, multiple UEs may not be assigned the same frequency resources since there is no way for the base station to distinguish them. Thus, in some cases, to allow for contention-based uplink transmissions, while keeping the FAR low, the base station may still set the DMRS CS field in a fixed manner, but a cyclic shift for DMRS transmissions for each UE can be given as part of the SPS configuration for the associated UE.

Figure 4:
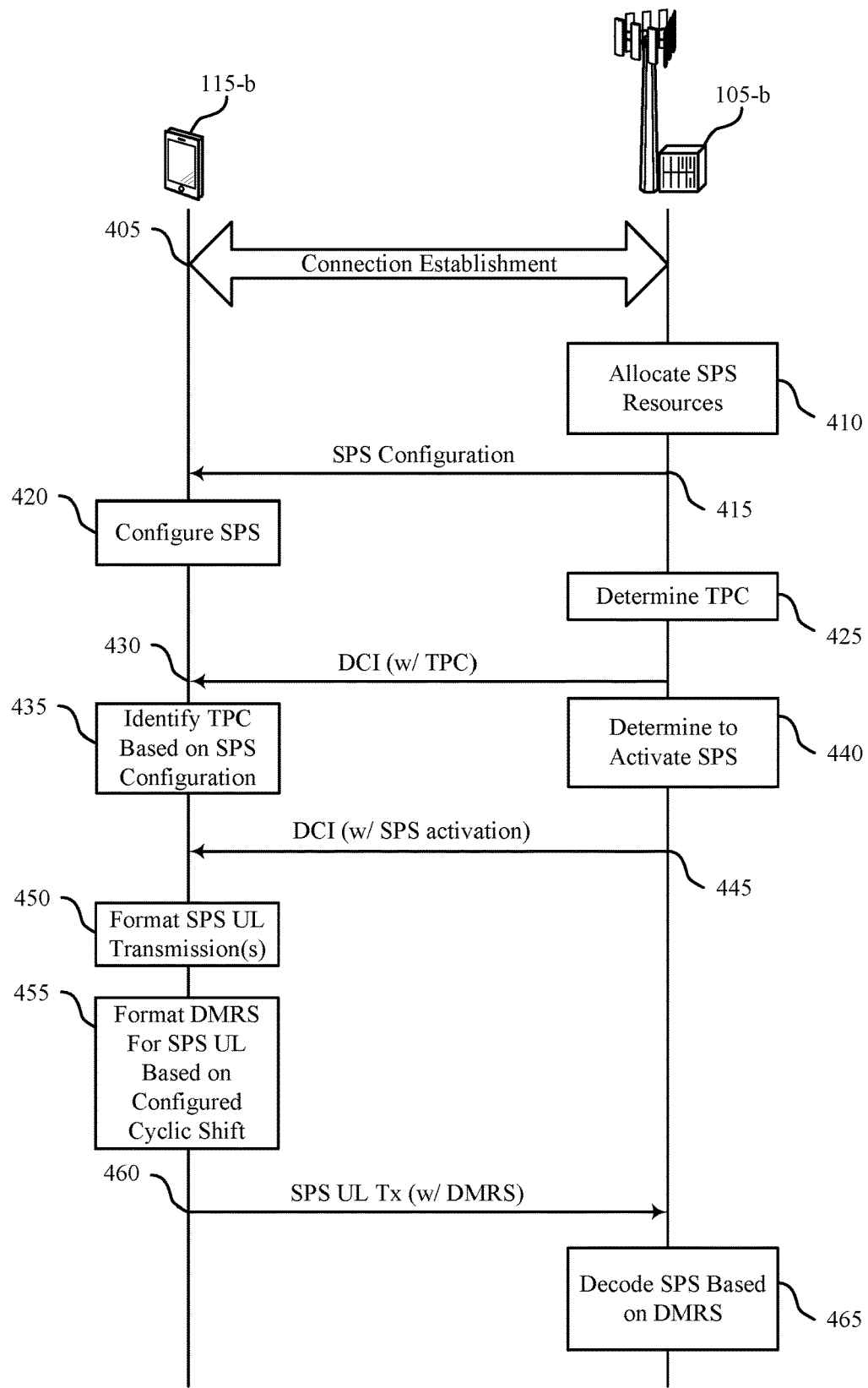
FIG. 4 illustrates an example of a process flow that supports uplink transmission techniques in low-latency wireless communication in accordance with aspects of the present disclosure.

FIG. 4 illustrates an example of a process flow 400 that supports uplink transmission techniques in low-latency wireless communication in accordance with various aspects of the present disclosure. In some examples, process flow 400 may implement aspects of wireless communication system 100. Process flow 400 may include the configuration and transmission of SPS between UE 115-b and base station 105-a. The base station 105-b may be an example of a base station 105 of FIG. 1 or 2, and the UE 115-*b* may be an example of a UE 115 of FIG. 1 or 2. Initially, the base station 105-*b* and UE 115-*b* may establish a connection 405. Such a connection establishment may be performed using established connection establishment techniques. In some cases, the connection 405 may have a wideband connection bandwidth.

At 410, the base station 105-*b* may allocate SPS resources for the UE 115-*b*. The SPS resources may be sTTI resources that may be used for SPS transmissions. In some cases, the base station 105-*b* may identify configuration information associated with the SPS transmissions, such as an index value for the UE 115-*b* to identify power control information in subsequent DCI transmissions, cyclic shift information that may be used to apply a cyclic shift to a reference signal, a number of HARQ processes, SPS periodicity, etc. The base station 105-*b* may transmit SPS configuration 415 to the UE 115-*b*. At 420, the UE 115-*b* may configure SPS in accordance with the SPS configuration that is received from the base station 105-*b*.

At 425, the base station 105-*b* may determine TPC for SPS sTTI transmissions. The TPC may be determined, in some cases, in accordance with closed-loop power control techniques such as established closed-loop power control techniques used in LTE. The base station 105-*b* may transmit DCI 430, with the TPC, to the UE 115-*b*. At 440, the base station may determine to activate the SPS and may transmit DCI 445 with SPS activation to the UE 115-*b*.

The UE 115-*b* at 435 may receive the DCI 430 and identify TPC based on the UE SPS configuration. In some cases, the SPS configuration may include an index for the UE 115-*b* that may be used as a pointer into a set of TPC information that is transmitted in DCI 430. The UE 115-*b*, may then receive the DCI 445 with SPS activation and, at 450, may format SPS uplink transmissions. In some cases, the UE 115-*b* may transmit a DMRS in the SPS transmissions and may, at 455, format the DMRS by applying a cyclic shift that is part of the UE 115-*b* SPS configuration. In some examples, the UE 115-*b* may configure, in accordance with the configuration information, the DMRS for transmission in one or more of the TTIs responsive to the activation command. Further, the UE 115-*b* may apply a cyclic shift to the DMRS, wherein the configuration information indicates the cyclic shift. The UE 115-*b* may then transmit one or more SPS uplink transmissions using sTTIs in accordance with the SPS resources that have been configured. The base station 105-*b* may, at 465, decode the SPS based on the DMRS, using the DMRS for channel estimation and for distinguishing UEs and to identify a UE that is transmitting the SPS transmissions. In some cases, the base station 105-*b* may provide, in addition to the SPS, scheduling-based sTTI UL resource allocations to the UE 115-*b*, which may be provided in DCI associated with a sTTI, and that the UE 115-*b* may receive and use for transmission of sTTI. In some cases, the TPC commands provided by the base station 105-*b* may apply to both sPUCCH and sPUSCH transmissions.

Figure 5:
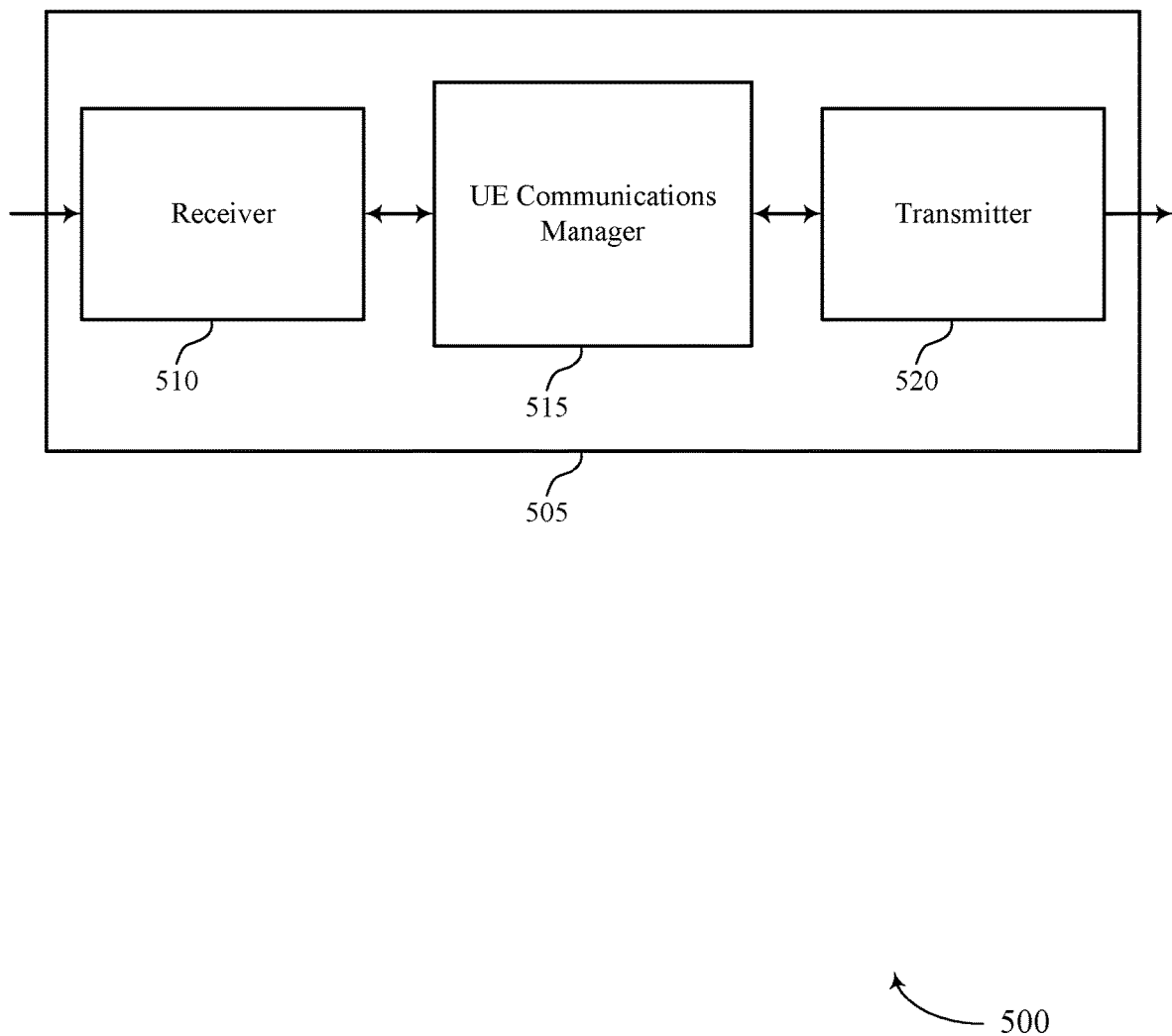
FIGS. 5 through 7 show block diagrams of a device that supports uplink transmission techniques in low-latency wireless communication in accordance with aspects of the present disclosure.

FIG. 5 shows a block diagram 500 of a wireless device 505 that supports uplink transmission techniques in low-latency wireless communication in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to uplink transmission techniques in low-latency wireless communication, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8.

UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may receive an SPS activation for transmitting uplink transmissions in a first set of TTIs, where the first set of TTIs have a first TTI duration that is shorter than a second TTI duration of a second set of TTIs, receive, during a first TTI of the second set of TTIs, first uplink power control information for setting a first uplink transmission power for at least one TTI of the first set of TTIs, and second uplink power control information for setting a second uplink transmission power for at least one TTI of the second set of TTIs, and set the first uplink power for the at least one TTI of the first set of TTIs.

In one example, the UE communications manager 515 may also receive, at a UE, an SPS configuration for transmitting uplink transmissions in a first set of TTIs, where the first set of TTIs have a first TTI duration that is shorter than a second TTI duration of a second set of TTIs, and where the SPS configuration includes configuration information that is to be applied to a DMRS transmitted in one or more of the first set of TTIs, receive, during a first TTI of the second set of TTIs, an activation command to activate the SPS configuration, format a DMRS for transmission in one of more of the first set of TTIs responsive to the activation command, and apply the cyclic shift to the DMRS. In other cases, the UE may configure, in accordance with the configuration information, the DMRS for transmission in one or more of the TTIs responsive to the activation command, and may transmit the configured DMRS in at least one of the first set of TTIs. Further, the UE may apply a cyclic shift to the DMRS, wherein the configuration information indicates at least the cyclic shift. In another example, the UE communications manager 515 may also receive, at a UE, an SPS configuration for transmitting uplink transmissions in a first set of TTIs, where the first set of TTIs have a first TTI duration that is shorter than a second TTI duration of a second set of TTIs, and where the SPS configuration includes configuration information that is to be configured for a DMRS transmitted in one or more of the first set of TTIs, receive, during a first TTI of the second set of TTIs, an activation command to activate the SPS, format a DMRS for transmission in one of more of the first set of TTIs responsive to the activation command, and configuring the information for the DMRS.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Transmitter 520 may transmit the at least one TTI of the first set of TTIs according to an SPS grant using the first uplink power and transmit the cyclic shifted DMRS in at least one of the first set of TTIs.

Figure 6:
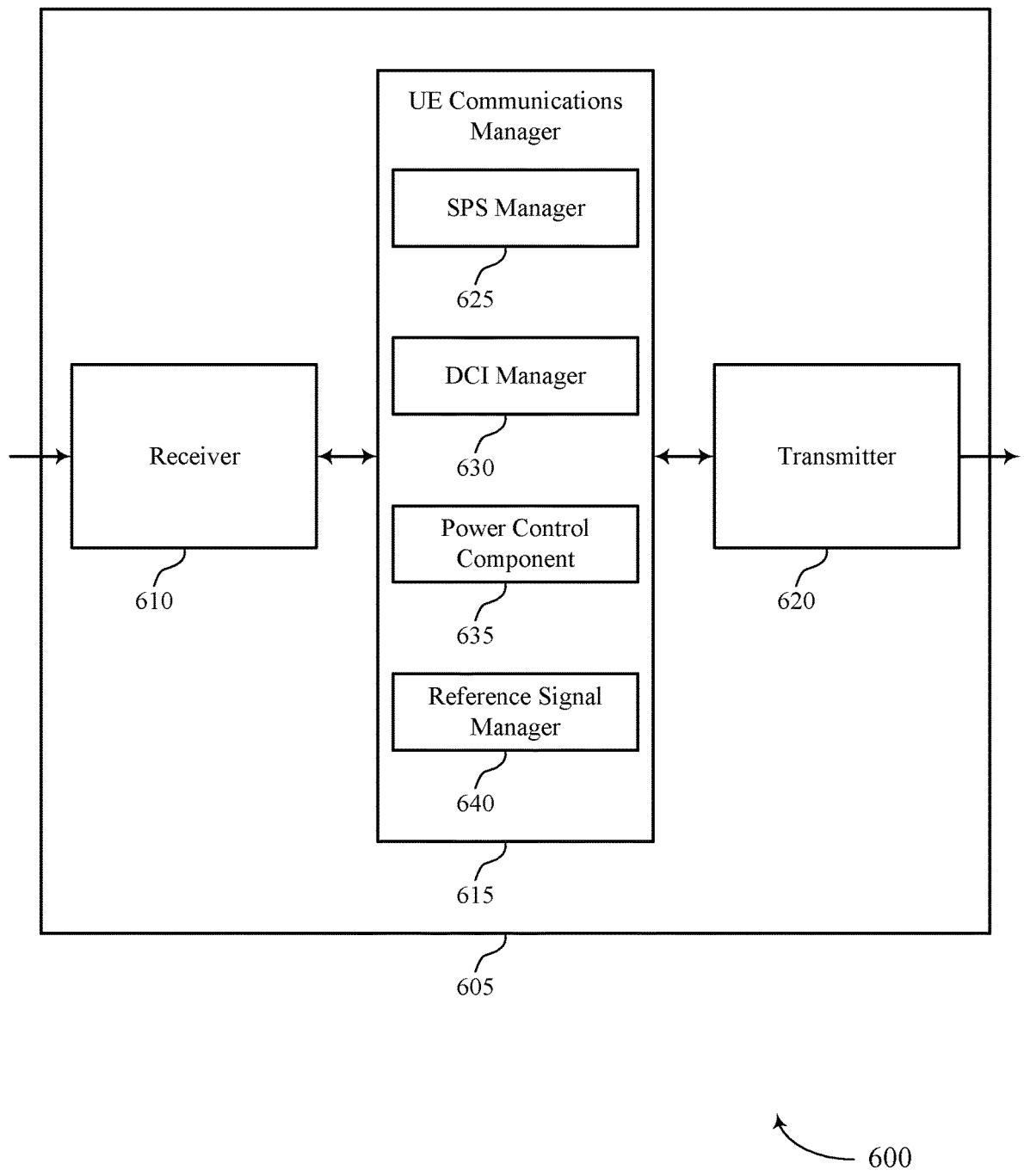

FIG. 6 shows a block diagram 600 of a wireless device 605 that supports uplink transmission techniques in low-latency wireless communication in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include one or more processors, memory coupled with the one or more processors, and instructions stored in the memory that are executable by the one or more processors to enable the one or more processors to perform the features discussed herein. Each of these components may be in communication with one another (e.g., via one or more buses).

Receiver 610 may receive information such as packets, user data, or control information associated with various information channels (e.g., control channels, data channels, and information related to uplink transmission techniques in low-latency wireless communication, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. In some cases, the UE communications manager 615 may be a processor (e.g., a transceiver processor, or a radio processor, or a receiver processor). The processor may be coupled with memory and execute instructions stored in the memory that enable the processor to perform or facilitate the features discussed herein. UE communications manager 615 may also include SPS manager 625, DCI manager 630, power control component 635, and reference signal manager 640.

SPS manager 625 may receive an SPS activation for transmitting uplink transmissions in a first set of TTIs, where the first set of TTIs have a first TTI duration that is shorter than a second TTI duration of a second set of TTIs. In some cases, the SPS manager 625 may be a processor. The processor may be coupled with memory and execute instructions stored in the memory that enable the processor to perform or facilitate the features discussed herein. In some cases, SPS manager 625 may receive an index value for identifying the first uplink power control information from a set of different power control information provided in the first TTI of the second set of TTIs. In some cases, SPS manager 625 may receive in the SPS configuration a cyclic shift that is to be applied to a DMRS transmitted in one or more of the first set of TTIs. In some cases, the multiple UEs are configured with non-orthogonal SPS resources. In some cases, the activation command includes a field indicating a DMRS cyclic shift that is ignored when the UE is applying the cyclic shift in accordance with the SPS configuration.

DCI manager 630 may receive, during a first TTI of the second set of TTIs, first uplink power control information for setting a first uplink transmission power for at least one TTI of the first set of TTIs, and second uplink power control information for setting a second uplink transmission power for at least one TTI of the second set of TTIs. In some cases, the DCI manager 630 may be a processor. The processor may be coupled with memory and execute instructions stored in the memory that enable the processor to perform or facilitate the features discussed herein. In some cases, the first uplink power control information and the second uplink power control information are transmitted in DCI. In some cases, the DCI uses DCI format 3/3A. In some cases, the DMRS cyclic shift indicated in the activation command is used to enhance reliability of the activation command and reduce a FAR for the activation command. In some cases, the activation command is received in DCI from a base station. In some cases, the DCI has a predetermined DCI format, namely DCI format 0, for activating the SPS. In some cases, the activation command is confirmed by verifying that a CRC of the activation command is scrambled by a SPS identification that is configured at the UE, and that one or more fields of the DCI, including a DMRS cyclic shift field, are set to predetermined pattern of values. In some cases, the DCI may be either one of format 3 or format 3a, and the DCI may be transmitted in a legacy LTE PDCCH region.

Power control component 635 may set the first uplink power for the at least one TTI of the first set of TTIs. In some cases, the Power control component 635 may be a processor. The processor may be coupled with memory and execute instructions stored in the memory that enable the processor to perform or facilitate the features discussed herein. In some cases, the uplink power control for the first set of TTIs is performed independently of uplink power control for the second set of TTIs. In some cases, the uplink power control for the first set of TTIs is performed independently of uplink power control for a third set of TTIs that have the first TTI duration. In some cases, the at least one TTI of the first set of TTIs is transmitted using the first uplink power in a subframe that is a next consecutive subframe following the receiving of the first uplink power control information.

Reference signal manager 640 may format a DMRS for transmission in one of more of the first set of TTIs responsive to the activation command and apply the cyclic shift to the DMRS. In some cases, the Reference signal manager 640 may be a processor. The processor may be coupled with memory and execute instructions stored in the memory that enable the processor to perform or facilitate the features discussed herein. In an example, reference signal manager 640 may format a DMRS for transmission in one of more of the first set of TTIs responsive to the activation command and configure the information for the DMRS. In some cases, the reference signal manager 640 may configure, in accordance with the configuration information, the DMRS for transmission in one or more of the first plurality of TTIs responsive to the activation command and may transmit the configured DMRS in at least one of the first set of TTIs.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
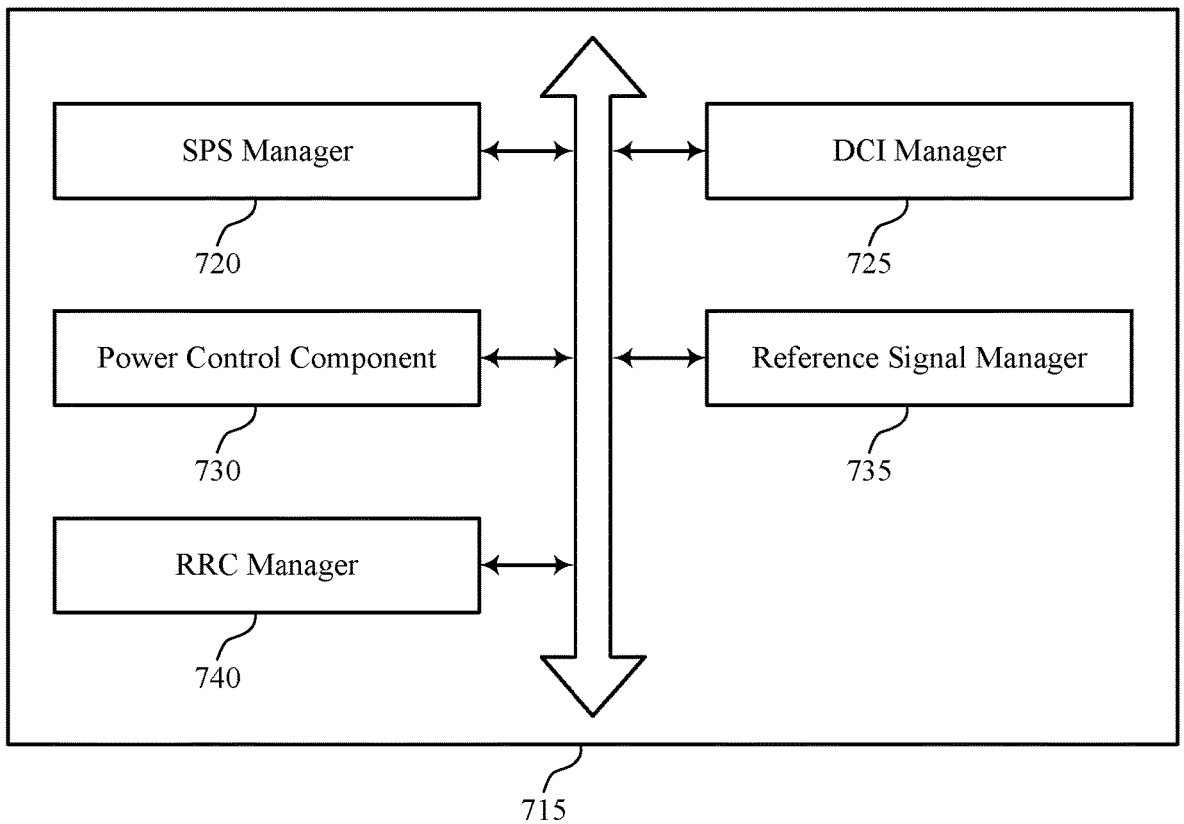

FIG. 7 shows a block diagram 700 of a UE communications manager 715 that supports uplink transmission techniques in low-latency wireless communication in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include SPS manager 720, DCI manager 725, power control component 730, reference signal manager 735, and RRC manager 740. Each of these modules may communicate, directly or indirectly, with one another (e.g., via one or more buses).

SPS manager 720 may receive an SPS activation for transmitting uplink transmissions in a first set of TTIs, where the first set of TTIs have a first TTI duration that is shorter than a second TTI duration of a second set of TTIs. In some cases, the SPS manager 720 may be a processor. The processor may be coupled with memory and execute instructions stored in the memory that enable the processor to perform or facilitate the features discussed herein. In some cases, SPS manager 720 may receive an index value for identifying the first uplink power control information from a set of different power control information provided in the first TTI of the second set of TTIs. In some cases, SPS manager 720 may receive in the SPS configuration a cyclic shift that is to be applied to a DMRS transmitted in one or more of the first set of TTIs. In some cases, the multiple UEs are configured with non-orthogonal SPS resources. In some cases, the activation command includes a field indicating a DMRS cyclic shift that is ignored when the UE is applying the cyclic shift in accordance with the SPS configuration.

DCI manager 725 may receive, during a first TTI of the second set of TTIs, first uplink power control information for setting a first uplink transmission power for at least one TTI of the first set of TTIs, and second uplink power control information for setting a second uplink transmission power for at least one TTI of the second set of TTIs. In some cases, the DCI manager 725 may be a processor. The processor may be coupled with memory and execute instructions stored in the memory that enable the processor to perform or facilitate the features discussed herein. In some cases, the first uplink power control information and the second uplink power control information are transmitted in DCI. In some cases, the DCI uses DCI format 3/3A. In some cases, the DMRS cyclic shift indicated in the activation command is used to enhance reliability of the activation command and reduce a FAR for the activation command. In some cases, the activation command is received in DCI from a base station. In some cases, the DCI has a predetermined DCI format, namely DCI format 0, for activating the SPS. In some cases, the activation command is confirmed by verifying that a CRC of the activation command is scrambled by a SPS identification that is configured at the UE, and that one or more fields of the DCI, including a DMRS cyclic shift field, are set to predetermined pattern of values.

Power control component 730 may set the first uplink power for the at least one TTI of the first set of TTIs. In some cases, the Power control component 730 may be a processor. The processor may be coupled with memory and execute instructions stored in the memory that enable the processor to perform or facilitate the features discussed herein. In some cases, the uplink power control for the first set of TTIs is performed independently of uplink power control for the second set of TTIs. In some cases, the uplink power control for the first set of TTIs is performed independently of uplink power control for a third set of TTIs that have the first TTI duration. In some cases, the at least one TTI of the first set of TTIs is transmitted using the first uplink power in a subframe that is a next consecutive subframe following the receiving of the first uplink power control information.

Reference signal manager 735 may format a DMRS for transmission in one of more of the first set of TTIs responsive to the activation command and apply the cyclic shift to the DMRS. In some cases, the Reference signal manager 735 may be a processor. The processor may be coupled with memory and execute instructions stored in the memory that enable the processor to perform or facilitate the features discussed herein. In an example, reference signal manager 735 may format a DMRS for transmission in one of more of the first set of TTIs responsive to the activation command and configure the information for the DMRS. In some cases, the reference signal manager 735 may configure, in accordance with the configuration information, the DMRS for transmission in one or more of the first plurality of TTIs responsive to the activation command and may transmit the configured DMRS in at least one of the first set of TTIs.

RRC manager 740 may receive and process RRC signaling. In some cases, the index value is received in a configuration information element via RRC signaling. In some cases, the RRC manager 740 may be a processor. The processor may be coupled with memory and execute instructions stored in the memory that enable the processor to perform or facilitate the features discussed herein. In some cases, the index value is received in a tcp-Index-sTTI field in a TPC-PDCCH-Config information element. In some cases, the index value may be separately set for PUSCH and PUCCH.

Figure 8:
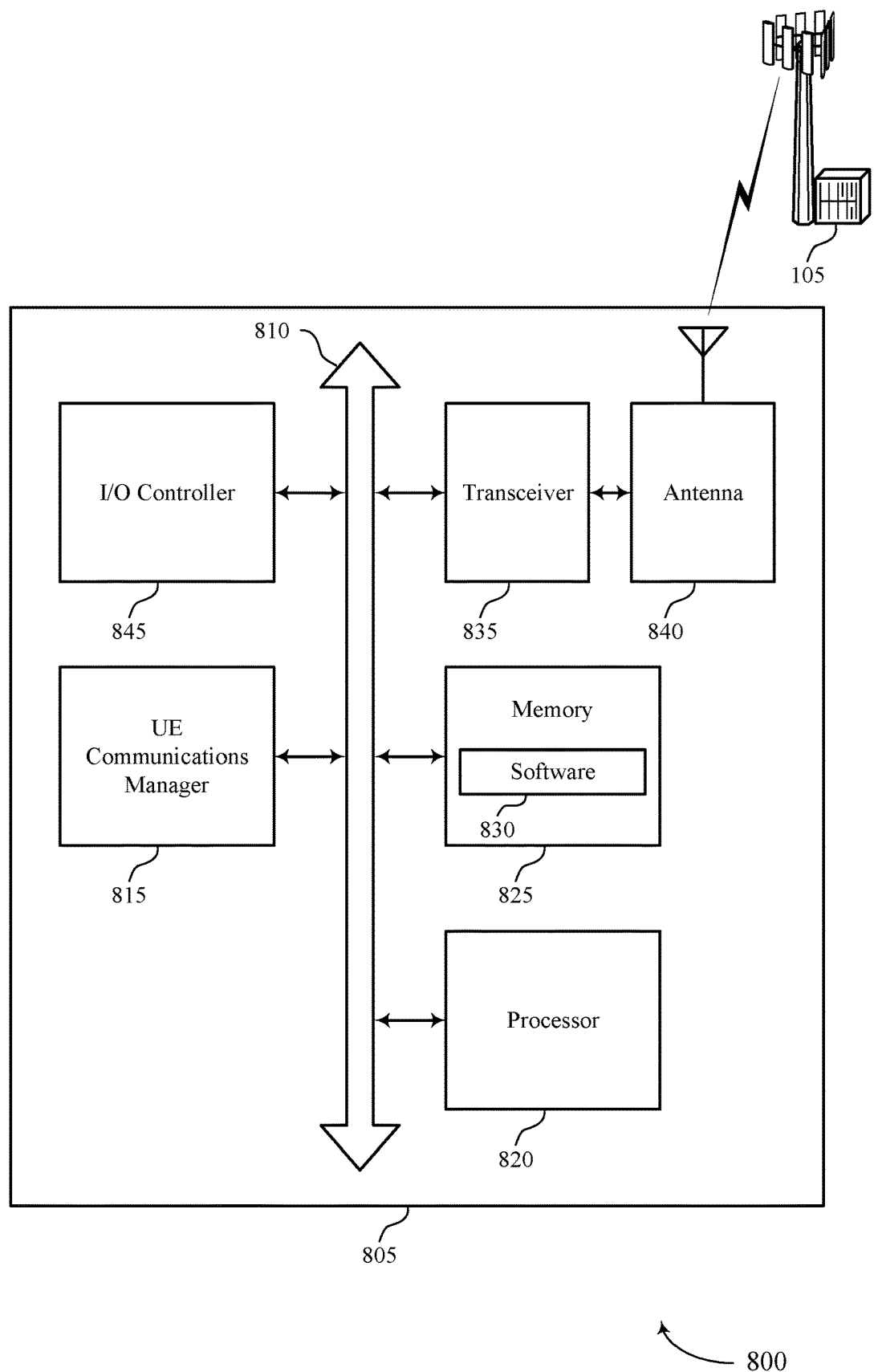
FIG. 8 illustrates a block diagram of a system including a UE that supports uplink transmission techniques in low-latency wireless communication in accordance with aspects of the present disclosure.

FIG. 8 shows a diagram of a system 800 including a device 805 that supports uplink transmission techniques in low-latency wireless communication in accordance with aspects of the present disclosure. Device 805 may be an example of or include the components of wireless device 505, wireless device 605, or a UE 115 as described herein, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting uplink transmission techniques in low-latency wireless communication).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support uplink transmission techniques in low-latency wireless communication. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described herein. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
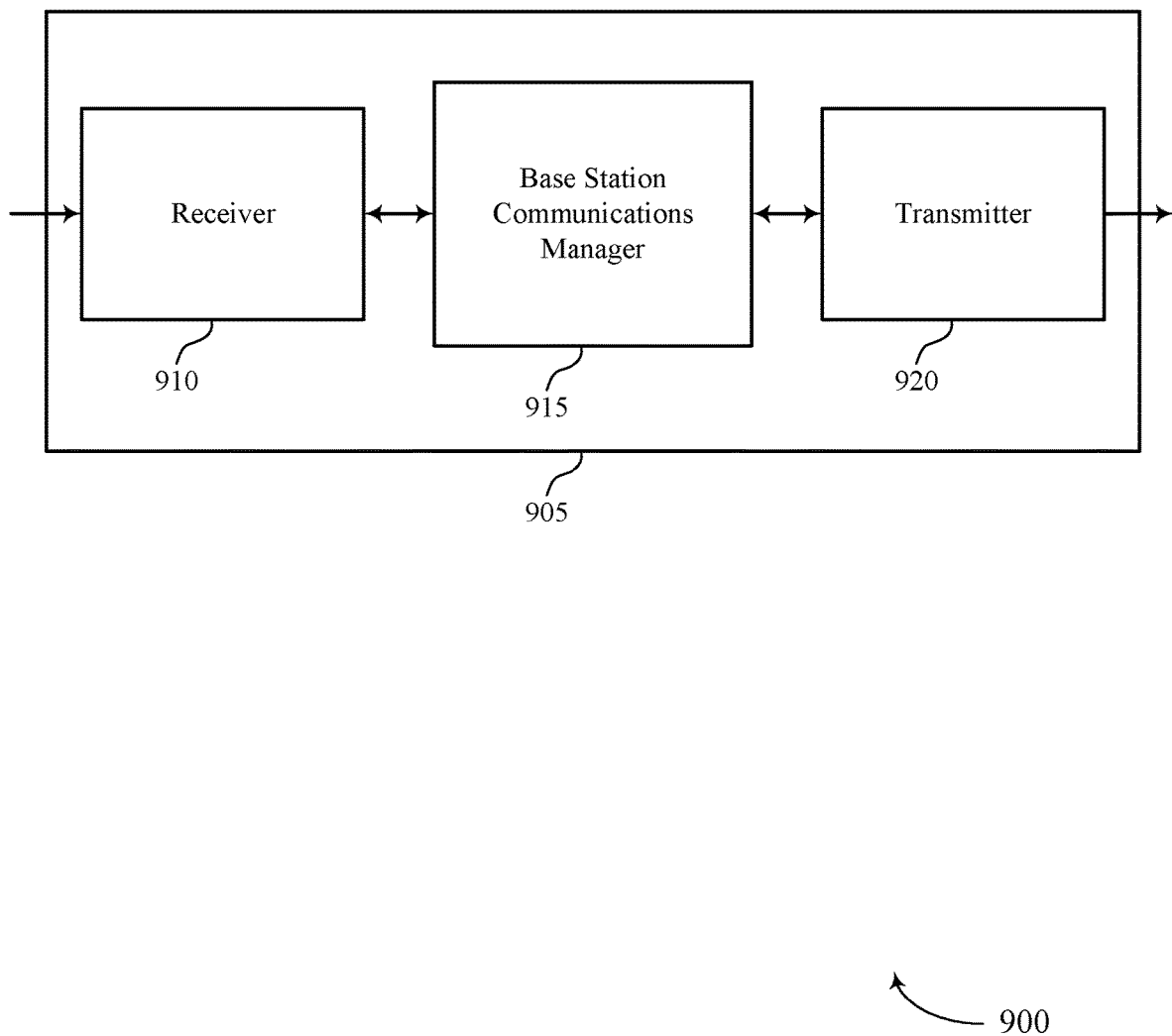
FIGS. 9 through 11 show block diagrams of a device that supports uplink transmission techniques in low-latency wireless communication in accordance with aspects of the present disclosure.

FIG. 9 shows a block diagram 900 of a wireless device 905 that supports uplink transmission techniques in low-latency wireless communication in accordance with aspects of the present disclosure. Wireless device 905 may be an example of aspects of a base station 105 as described herein. Wireless device 905 may include receiver 910, base station communications manager 915, and transmitter 920. Wireless device 905 may also include one or more processors, memory coupled with the one or more processors, and instructions stored in the memory that are executable by the one or more processors to enable the one or more processors to perform the features discussed herein. Each of these components may be in communication with one another (e.g., via one or more buses).

Receiver 910 may receive information such as packets, user data, or control information associated with various information channels (e.g., control channels, data channels, and information related to uplink transmission techniques in low-latency wireless communication, etc.). Information may be passed on to other components of the device. The receiver 910 may be an example of aspects of the transceiver 1235 described with reference to FIG. 12. The receiver 910 may utilize a single antenna or a set of antennas.

Receiver 910 may receive one or more uplink transmissions in the first set of TTIs, the one or more uplink transmissions including a DMRS transmission.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may transmit, to a UE, an SPS activation for transmitting uplink transmissions in a first set of TTIs, where the first set of TTIs have a first TTI duration that is shorter than a second TTI duration of a second set of TTIs and determine first uplink power control information for setting a first uplink transmission power at the UE for at least one TTI of the first set of TTIs, and second uplink power control information for setting a second uplink transmission power for at least one TTI of the second set of TTIs.

In one example, the base station communications manager 915 may also transmit, to a UE, an SPS configuration for uplink transmissions from the UE in a first set of TTIs, where the first set of TTIs have a first TTI duration that is shorter than a second TTI duration of a second set of TTIs, and where the SPS configuration includes a cyclic shift (and in some examples configuration information) that is to be applied to a DMRS transmitted in one or more of the first set of TTIs, transmit, during a first TTI of the second set of TTIs, an activation command to the UE to activate the SPS, apply the cyclic shift to the DMRS, and decode the one or more uplink transmissions based on the cyclic shifted DMRS. In another example, the base station communications manager 915 may also transmit, to a UE, an SPS configuration for uplink transmissions from the UE in a first set of TTIs, where the first set of TTIs have a first TTI duration that is shorter than a second TTI duration of a second set of TTIs, and where the SPS configuration includes configuration information that is to be applied to a DMRS transmitted in one or more of the first set of TTIs, transmit, during a first TTI of the second set of TTIs, an activation command to the UE to activate the SPS, process the DMRS in accordance with the configuration information, and decode the one or more uplink transmissions based on the processed DMRS.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Transmitter 920 may transmit, during a first TTI of the second set of TTIs, the first uplink power control information and the second uplink power control information to the UE.

Figure 10:
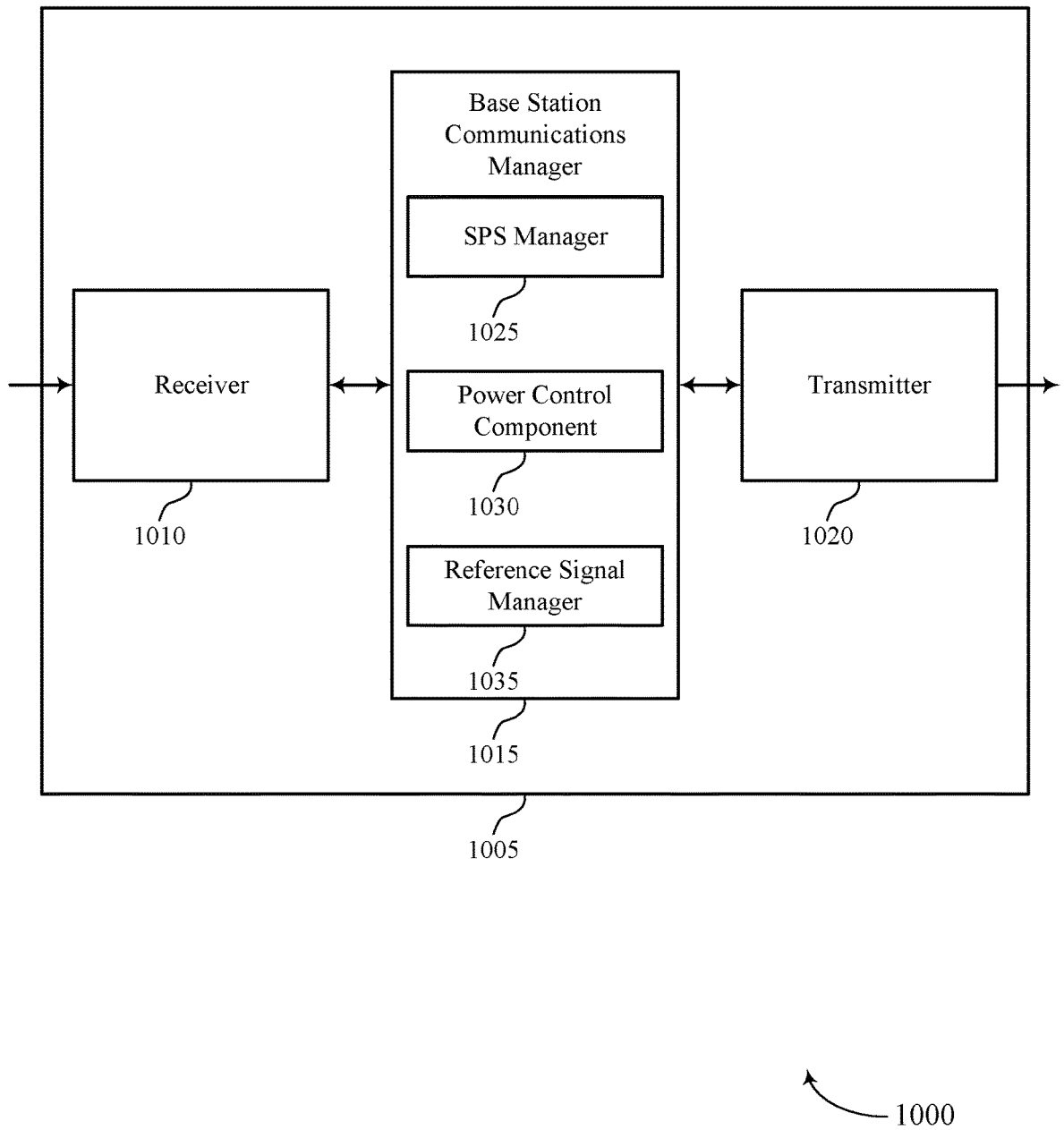

FIG. 10 shows a block diagram 1000 of a wireless device 1005 that supports uplink transmission techniques in low-latency wireless communication in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to uplink transmission techniques in low-latency wireless communication, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12.

Base station communications manager 1015 may also include SPS manager 1025, power control component 1030, and reference signal manager 1035.

SPS manager 1025 may transmit, to a UE, an SPS activation for transmitting uplink transmissions in a first set of TTIs. In some cases, the SPS manager 1025 may be a processor. The processor may be coupled with memory and execute instructions stored in the memory that enable the processor to perform or facilitate the features discussed herein. In some cases, SPS manager 1025 may configure the UE with an index value for identifying the first uplink power control information from a set of different power control information provided in the first TTI of the second set of TTIs, where the first set of TTIs have a first TTI duration that is shorter than a second TTI duration of a second set of TTIs. In some cases, SPS manager 1025 may transmit, to a UE, an SPS configuration for uplink transmissions from the UE in a first set of TTIs, and where the SPS configuration includes a cyclic shift that is to be applied to a DMRS transmitted in one or more of the first set of TTIs. SPS manager 1025 may also transmit, during a first TTI of the second set of TTIs, an activation command to the UE to activate the SPS. In some cases, the multiple UEs are configured with non-orthogonal SPS resources.

Power control component 1030 may determine first uplink power control information for setting a first uplink transmission power at the UE for at least one TTI of the first set of TTIs, and second uplink power control information for setting a second uplink transmission power for at least one TTI of the second set of TTIs. In some cases, the Power control component 1030 may be a processor. The processor may be coupled with memory and execute instructions stored in the memory that enable the processor to perform or facilitate the features discussed herein. In some cases, the uplink power control for the first set of TTIs is performed independently of uplink power control for the second set of TTIs. In some cases, the uplink power control for the first set of TTIs is performed independently of uplink power control for a third set of TTIs that have the first TTI duration.

Reference signal manager 1035 processing the DMRS in accordance with the configuration information and decode the one or more uplink transmissions based on the processed DMRS. In some cases, the Reference signal manager 1035 may be a processor. The processor may be coupled with memory and execute instructions stored in the memory that enable the processor to perform or facilitate the features discussed herein.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
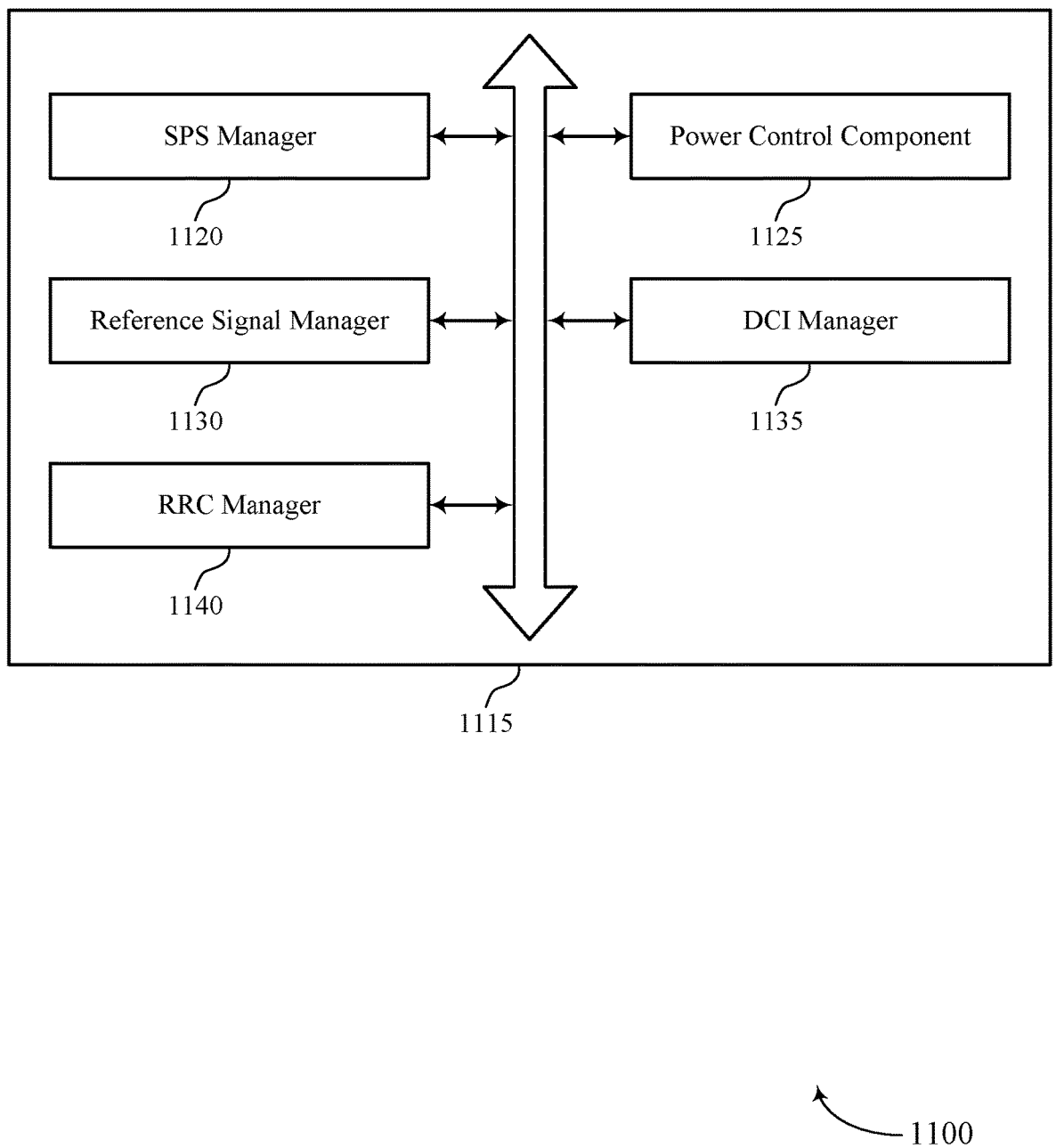

FIG. 11 shows a block diagram 1100 of a base station communications manager 1115 that supports uplink transmission techniques in low-latency wireless communication in accordance with aspects of the present disclosure. The base station communications manager 1115 may be an example of aspects of a base station communications manager 1215 described with reference to FIGS. 9, 10, and 12. The base station communications manager 1115 may include SPS manager 1120, power control component 1125, reference signal manager 1130, DCI manager 1135, and RRC manager 1140. Each of these modules may communicate, directly or indirectly, with one another (e.g., via one or more buses).

SPS manager 1120 may transmit, to a UE, an SPS activation for transmitting uplink transmissions in a first set of TTIs. In some cases, the SPS manager 1120 may be a processor. The processor may be coupled with memory and execute instructions stored in the memory that enable the processor to perform or facilitate the features discussed herein. In some cases, SPS manager 1120 may configure the UE with an index value for identifying the first uplink power control information from a set of different power control information provided in the first TTI of the second set of TTIs, where the first set of TTIs have a first TTI duration that is shorter than a second TTI duration of a second set of TTIs. In some cases, SPS manager 1120 may transmit, to a UE, an SPS configuration for uplink transmissions from the UE in a first set of TTIs, and where the SPS configuration includes a cyclic shift that is to be applied to a DMRS transmitted in one or more of the first set of TTIs. SPS manager 1120 may also transmit, during a first TTI of the second set of TTIs, an activation command to the UE to activate the SPS. In some cases, the multiple UEs are configured with non-orthogonal SPS resources.

Power control component 1125 may determine first uplink power control information for setting a first uplink transmission power at the UE for at least one TTI of the first set of TTIs, and second uplink power control information for setting a second uplink transmission power for at least one TTI of the second set of TTIs. In some cases, the Power control component 1125 may be a processor. The processor may be coupled with memory and execute instructions stored in the memory that enable the processor to perform or facilitate the features discussed herein. In some cases, the uplink power control for the first set of TTIs is performed independently of uplink power control for the second set of TTIs. In some cases, the uplink power control for the first set of TTIs is performed independently of uplink power control for a third set of TTIs that have the first TTI duration.

Reference signal manager 1130 may process the DMRS in accordance with the configuration information and in some examples may apply a cyclic shift to the DMRS indicated in the configuration information and decode the one or more uplink transmissions based on the processed DMRS. processed DMRS. In some cases, the Reference signal manager 1130 may be a processor. The processor may be coupled with memory and execute instructions stored in the memory that enable the processor to perform or facilitate the features discussed herein.

DCI manager 1135 may identify DCI and transmit DCI to one or more UEs. In some cases, the DCI manager 1135 may be a processor. The processor may be coupled with memory and execute instructions stored in the memory that enable the processor to perform or facilitate the features discussed herein. In some cases, the first uplink power control information and the second uplink power control information are transmitted in DCI. In some cases, the activation command includes a field indicating a DMRS cyclic shift that is ignored by the UE when applying the cyclic shift to the DMRS. RRC manager 1140 may manage RRC signaling. In some cases, the index value is transmitted to the UE in a configuration information element via RRC signaling.

Figure 12:
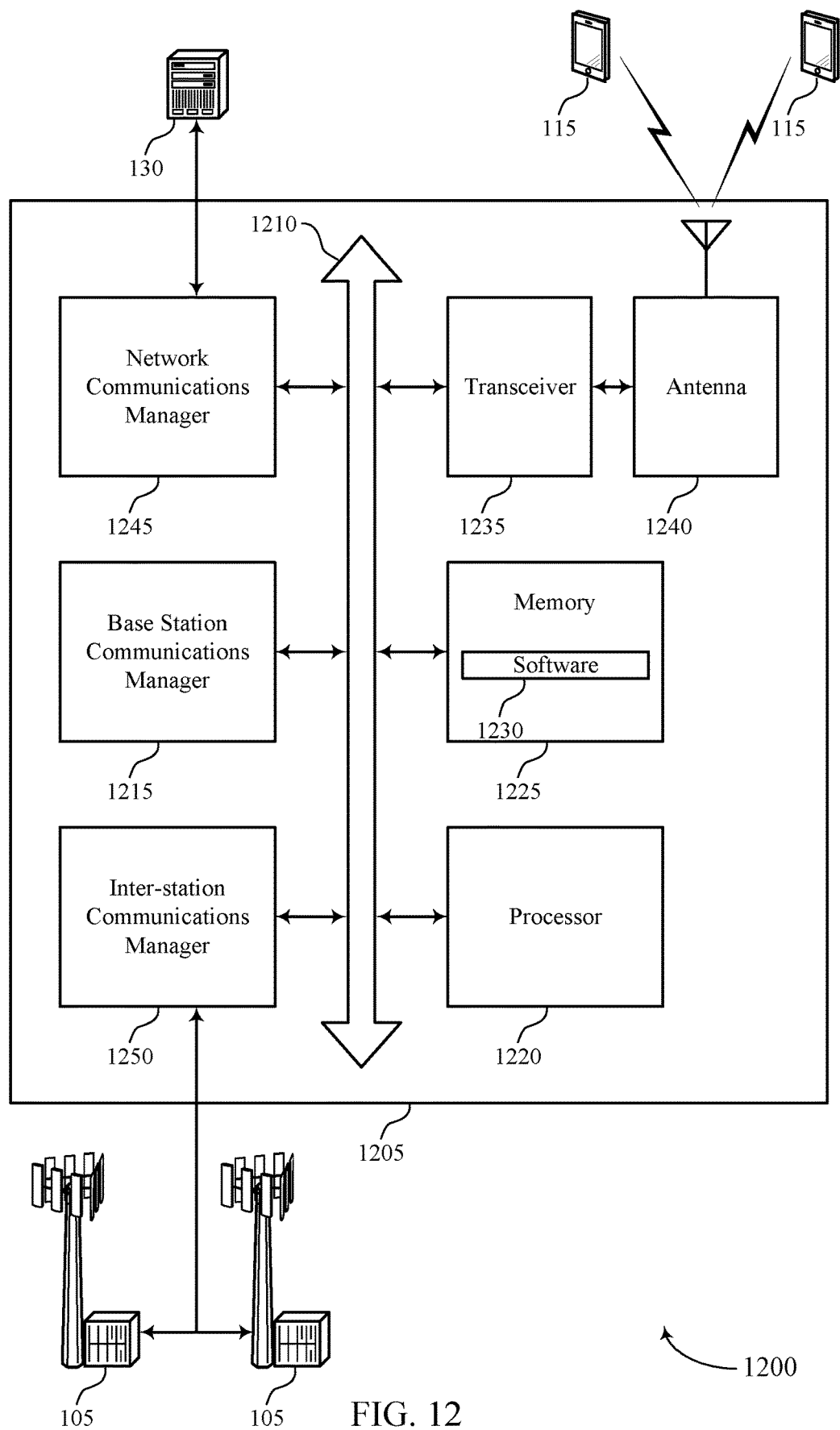
FIG. 12 illustrates a block diagram of a system including a base station that supports uplink transmission techniques in low-latency wireless communication in accordance with aspects of the present disclosure.

FIG. 12 shows a diagram of a system 1200 including a device 1205 that supports uplink transmission techniques in low-latency wireless communication in accordance with aspects of the present disclosure. Device 1205 may be an example of or include the components of base station 105 as described herein, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting uplink transmission techniques in low-latency wireless communication).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support uplink transmission techniques in low-latency wireless communication. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
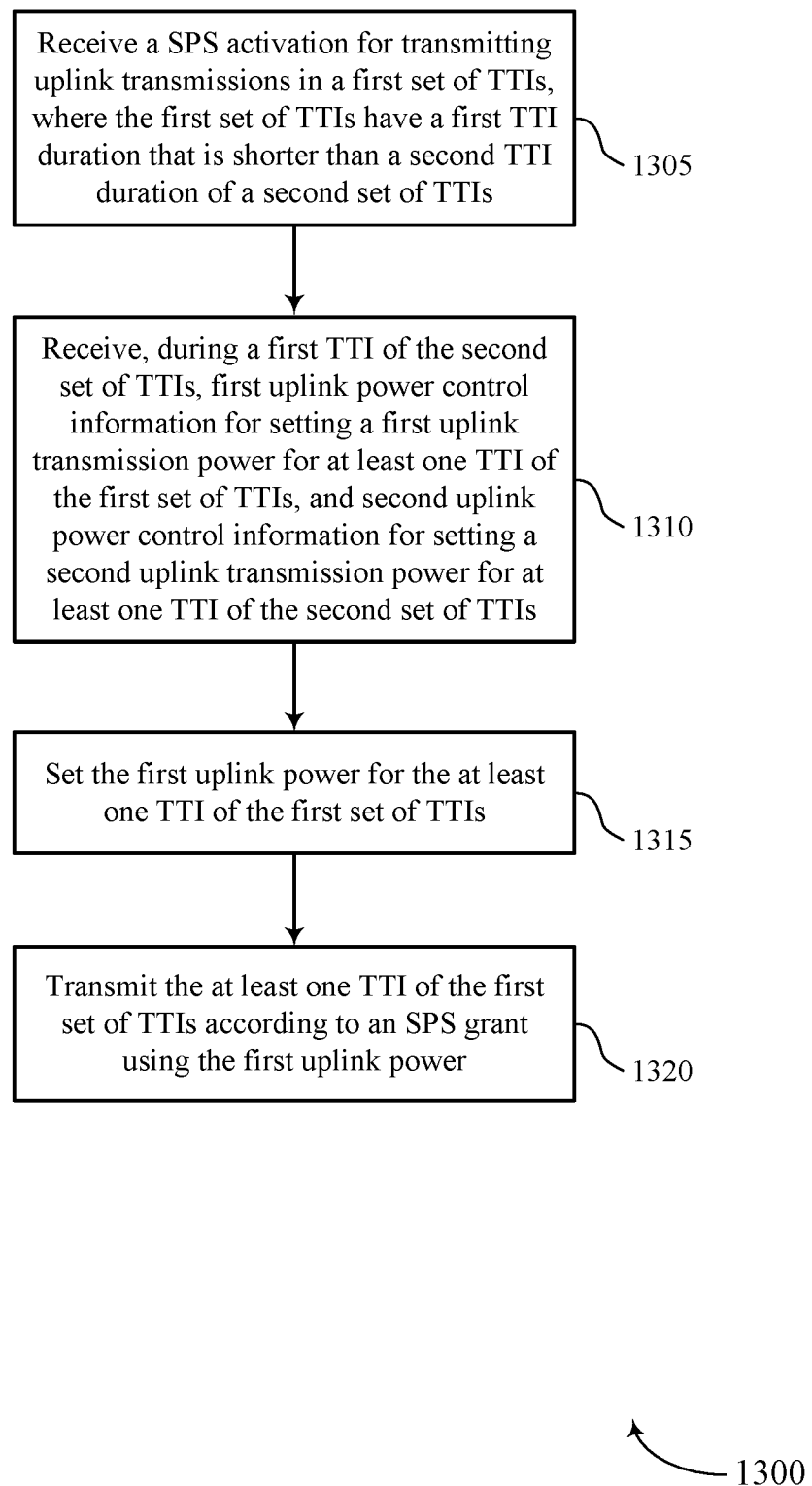
FIGS. 13 through 18 illustrate methods for uplink transmission techniques in low-latency wireless communication in accordance with aspects of the present disclosure.

FIG. 13 shows a flowchart illustrating a method 1300 for uplink transmission techniques in low-latency wireless communication in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive an SPS activation for transmitting uplink transmissions in a first plurality of TTIs, wherein the first plurality of TTIs have a first TTI duration that is shorter than a second TTI duration of a second plurality of TTIs. The operations of 1305 may be performed according to the methods described herein. In certain examples, aspects of the operations of 1305 may be performed by a SPS manager as described with reference to FIGS. 5 through 8.

At 1310 the UE 115 may receive, during a first TTI of the second plurality of TTIs, first uplink power control information for setting a first uplink transmission power for at least one TTI of the first plurality of TTIs, and second uplink power control information for setting a second uplink transmission power for at least one TTI of the second plurality of TTIs. The operations of 1310 may be performed according to the methods described herein. In certain examples, aspects of the operations of 1310 may be performed by a DCI manager as described with reference to FIGS. 5 through 8. In some cases, the power control command may be different for PUCCH and PUSCH and different TPC indices may be configured, accordingly.

At 1315 the UE 115 may set the first uplink power for the at least one TTI of the first plurality of TTIs. The operations of 1315 may be performed according to the methods described herein. In certain examples, aspects of the operations of 1315 may be performed by a power control component as described with reference to FIGS. 5 through 8.

At 1320 the UE 115 may transmit the at least one TTI of the first plurality of TTIs according to an SPS grant using the first uplink power. The operations of 1320 may be performed according to the methods described herein. In certain examples, aspects of the operations of 1320 may be performed by a transmitter as described with reference to FIGS. 5 through 8.

Figure 14:
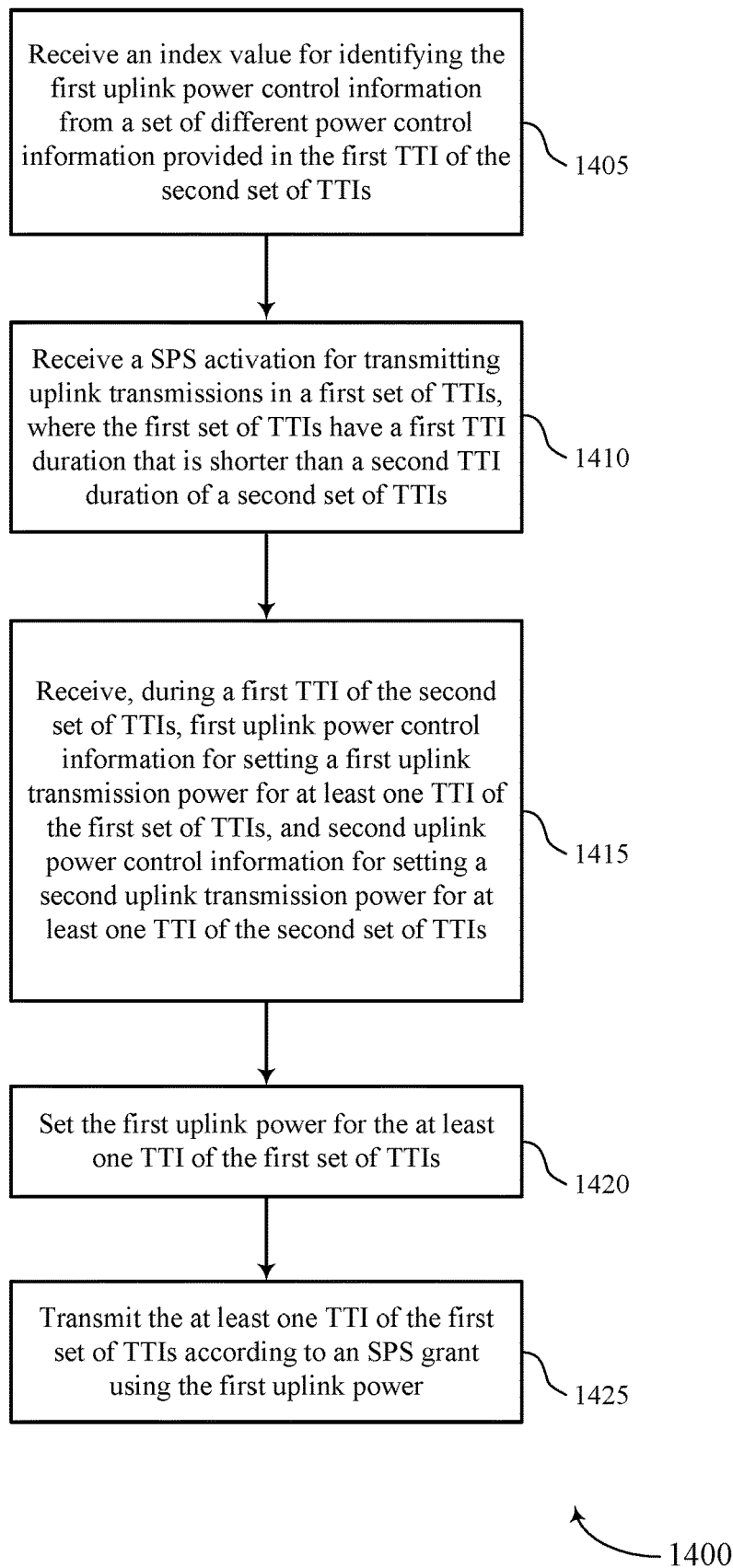

FIG. 14 shows a flowchart illustrating a method 1400 for uplink transmission techniques in low-latency wireless communication in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive an index value for identifying the first uplink power control information from a plurality of different power control information provided in the first TTI of a second plurality of TTIs. The operations of 1405 may be performed according to the methods described herein. In certain examples, aspects of the operations of 1405 may be performed by a SPS manager as described with reference to FIGS. 5 through 8.

At 1410 the UE 115 may receive an SPS activation for transmitting uplink transmissions in a first plurality of TTIs, wherein the first plurality of TTIs have a first TTI duration that is shorter than a second TTI duration of a second plurality of TTIs. The operations of 1410 may be performed according to the methods described herein. In certain examples, aspects of the operations of 1410 may be performed by a SPS manager as described with reference to FIGS. 5 through 8.

At 1415 the UE 115 may receive, during a first TTI of the second plurality of TTIs, first uplink power control information for setting a first uplink transmission power for at least one TTI of the first plurality of TTIs, and second uplink power control information for setting a second uplink transmission power for at least one TTI of the second plurality of TTIs. The operations of 1415 may be performed according to the methods described herein. In certain examples, aspects of the operations of 1415 may be performed by a DCI manager as described with reference to FIGS. 5 through 8.

At 1420 the UE 115 may set the first uplink power for the at least one TTI of the first plurality of TTIs. The operations of 1420 may be performed according to the methods described herein. In certain examples, aspects of the operations of 1420 may be performed by a power control component as described with reference to FIGS. 5 through 8.

At 1425 the UE 115 may transmit the at least one TTI of the first plurality of TTIs according to an SPS grant using the first uplink power. The operations of 1425 may be performed according to the methods described herein. In certain examples, aspects of the operations of 1425 may be performed by a transmitter as described with reference to FIGS. 5 through 8.

Figure 15:
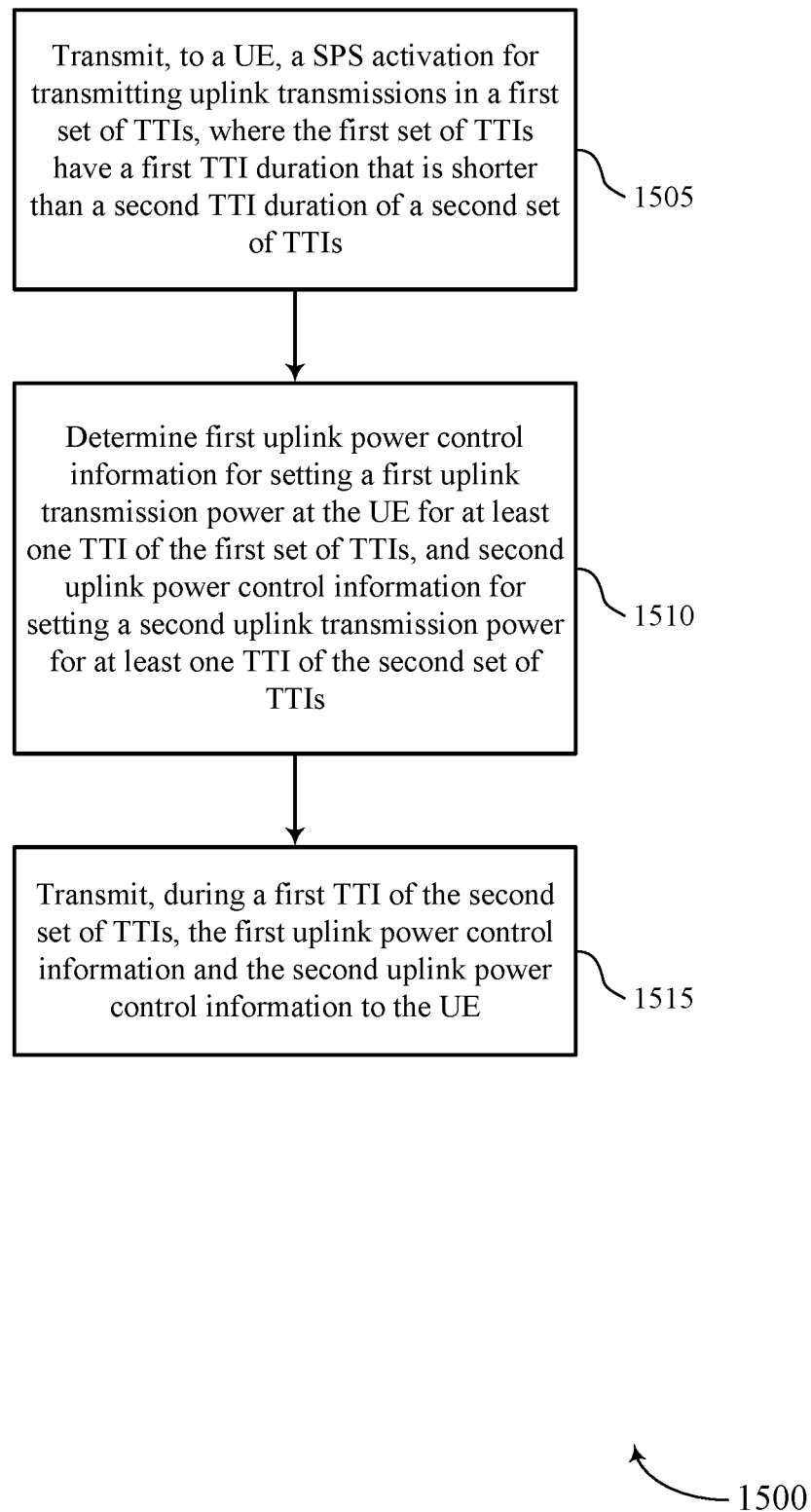

FIG. 15 shows a flowchart illustrating a method 1500 for uplink transmission techniques in low-latency wireless communication in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may transmit, to a UE, an SPS activation for transmitting uplink transmissions in a first plurality of TTIs, wherein the first plurality of TTIs have a first TTI duration that is shorter than a second TTI duration of a second plurality of TTIs. The operations of 1505 may be performed according to the methods described herein. In certain examples, aspects of the operations of 1505 may be performed by a SPS manager as described with reference to FIGS. 9 through 12.

At 1510 the base station 105 may determine first uplink power control information for setting a first uplink transmission power at the UE for at least one TTI of the first plurality of TTIs, and second uplink power control information for setting a second uplink transmission power for at least one TTI of the second plurality of TTIs. The operations of 1510 may be performed according to the methods described herein. In certain examples, aspects of the operations of 1510 may be performed by a power control component as described with reference to FIGS. 9 through 12.

At 1515 the base station 105 may transmit, during a first TTI of the second plurality of TTIs, the first uplink power control information and the second uplink power control information to the UE. The operations of 1515 may be performed according to the methods described herein. In certain examples, aspects of the operations of 1515 may be performed by a transmitter as described with reference to FIGS. 9 through 12.

Figure 16:
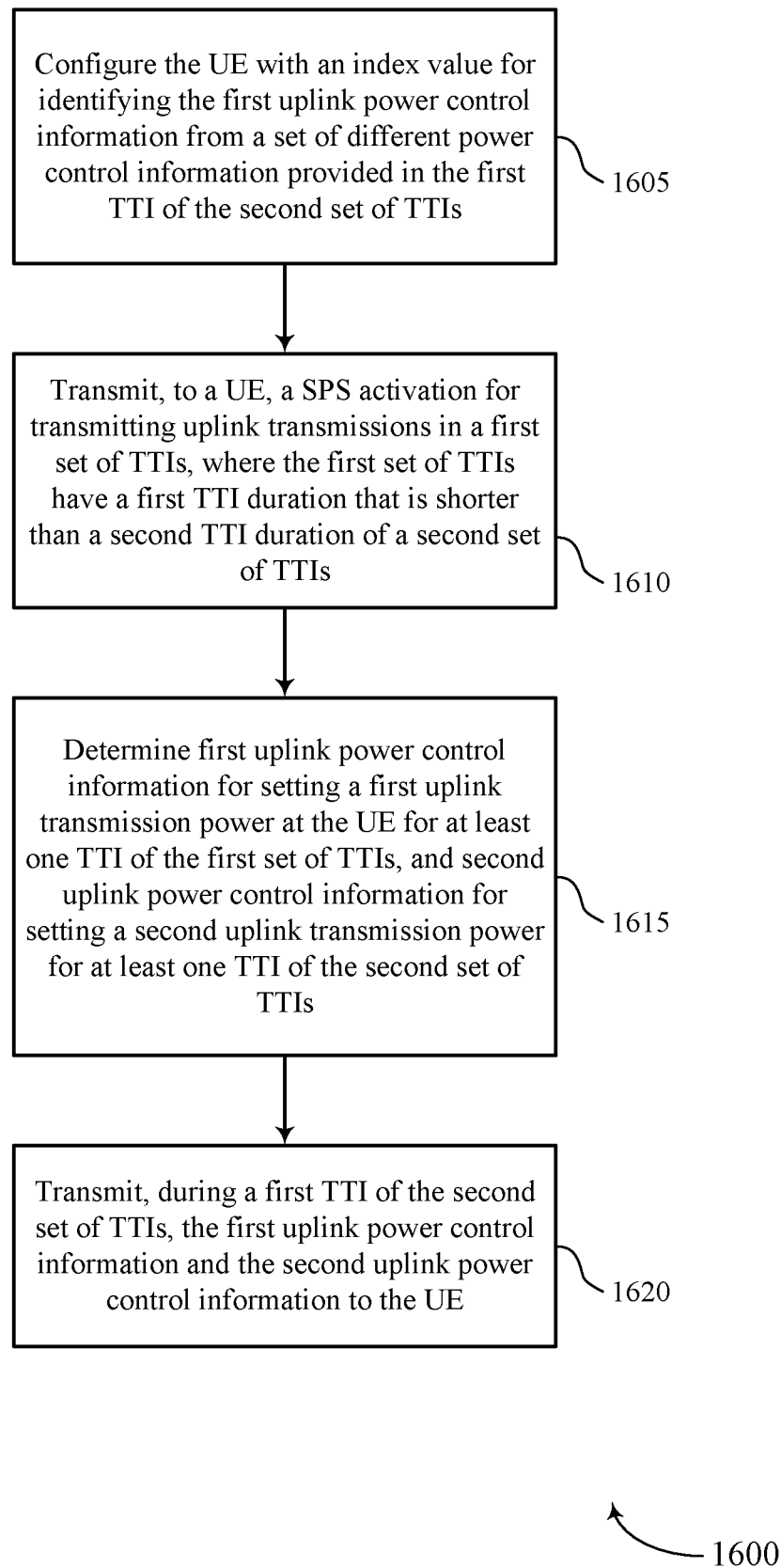

FIG. 16 shows a flowchart illustrating a method 1600 for uplink transmission techniques in low-latency wireless communication in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may configure the UE with an index value for identifying the first uplink power control information from a plurality of different power control information provided in the first TTI of the second plurality of TTIs. The operations of 1605 may be performed according to the methods described herein. In certain examples, aspects of the operations of 1605 may be performed by a SPS manager as described with reference to FIGS. 9 through 12.

At 1610 the base station 105 may transmit, to a UE, an SPS activation for transmitting uplink transmissions in a first plurality of TTIs, wherein the first plurality of TTIs have a first TTI duration that is shorter than a second TTI duration of a second plurality of TTIs. The operations of 1610 may be performed according to the methods described herein. In certain examples, aspects of the operations of 1610 may be performed by a SPS manager as described with reference to FIGS. 9 through 12.

At 1615 the base station 105 may determine first uplink power control information for setting a first uplink transmission power at the UE for at least one TTI of the first plurality of TTIs, and second uplink power control information for setting a second uplink transmission power for at least one TTI of the second plurality of TTIs. The operations of 1615 may be performed according to the methods described herein. In certain examples, aspects of the operations of 1615 may be performed by a power control component as described with reference to FIGS. 9 through 12.

At 1620 the base station 105 may transmit, during a first TTI of the second plurality of TTIs, the first uplink power control information and the second uplink power control information to the UE. The operations of 1620 may be performed according to the methods described herein. In certain examples, aspects of the operations of 1620 may be performed by a transmitter as described with reference to FIGS. 9 through 12.

Figure 17:
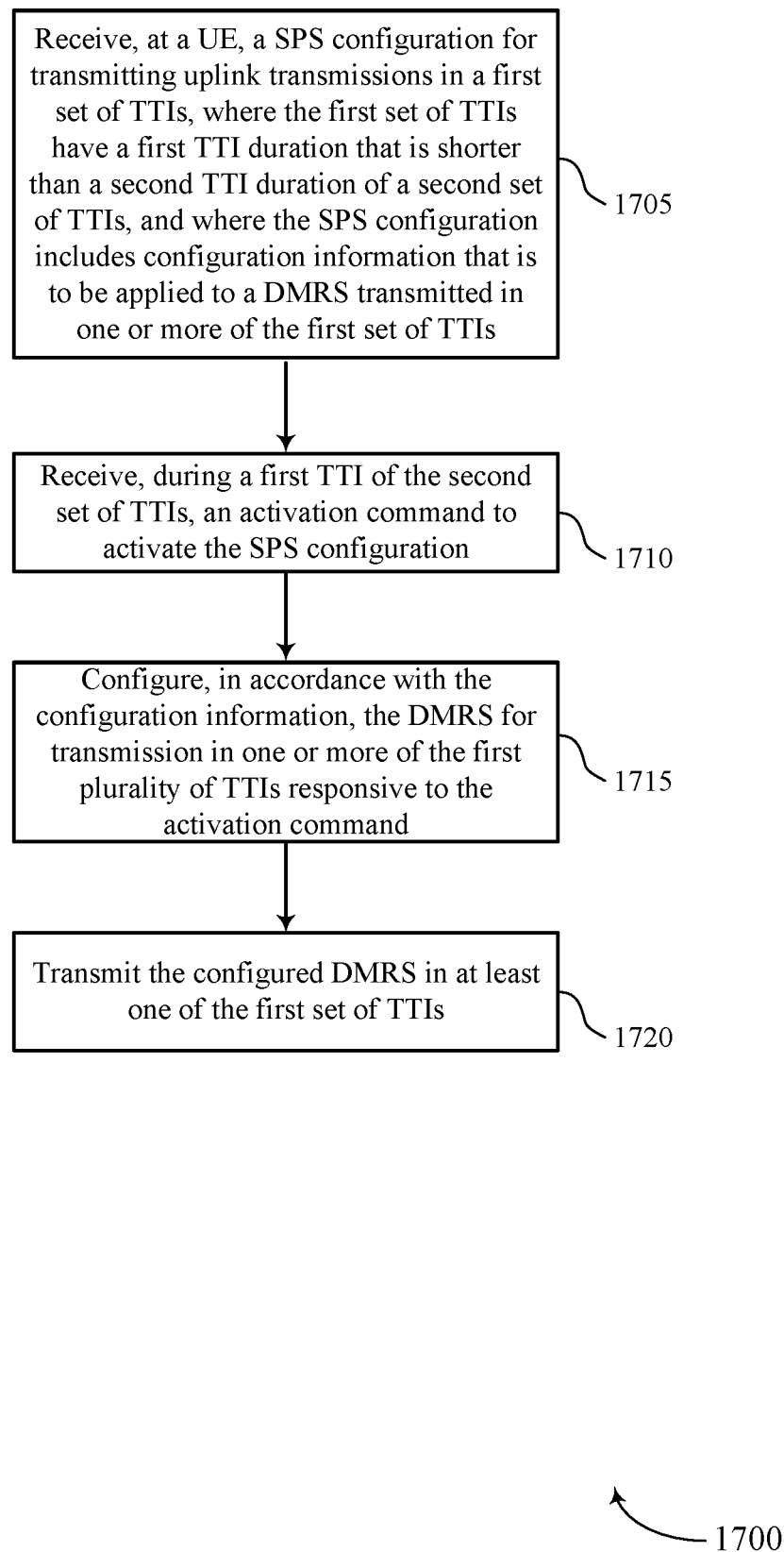

FIG. 17 shows a flowchart illustrating a method 1700 for uplink transmission techniques in low-latency wireless communication in accordance with aspects of the present disclosure. The operations of method 1700 may be implemented by a UE 115 or its components as described herein. For example, the operations of method 1700 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive, at a UE, an SPS configuration for transmitting uplink transmissions in a first plurality of TTIs, wherein the first plurality of TTIs have a first TTI duration that is shorter than a second TTI duration of a second plurality of TTIs, and wherein the SPS configuration includes a cyclic shift that is to be applied to a DMRS transmitted in one or more of the first plurality of TTIs. The operations of 1705 may be performed according to the methods described herein. In certain examples, aspects of the operations of 1705 may be performed by a SPS manager as described with reference to FIGS. 5 through 8.

At 1710 the UE 115 may receive, during a first TTI of the second plurality of TTIs, an activation command to activate the SPS. The operations of 1710 may be performed according to the methods described herein. In certain examples, aspects of the operations of 1710 may be performed by a SPS manager as described with reference to FIGS. 5 through 8.

At 1715 the UE 115 may configure, in accordance with the configuration information, the DMRS for transmission in one or more of the first plurality of TTIs responsive to the activation command. In some examples, the UE 115 may apply a cyclic shift to the DMRS indicated in the configuration information. The operations of 1715 may be performed according to the methods described herein. In certain examples, aspects of the operations of 1715 may be performed by a reference signal manager as described with reference to FIGS. 5 through 8.

At 1720 the UE 115 may transmit the configured DMRS in at least one of the first set of TTIs. In some examples, the UE 115 may transmit the cyclic shifted DMRS in at least one of the first plurality of TTIs. The operations of 1720 may be performed according to the methods described herein. In certain examples, aspects of the operations of 1720 may be performed by a transmitter as described with reference to FIGS. 5 through 8.

Figure 18:
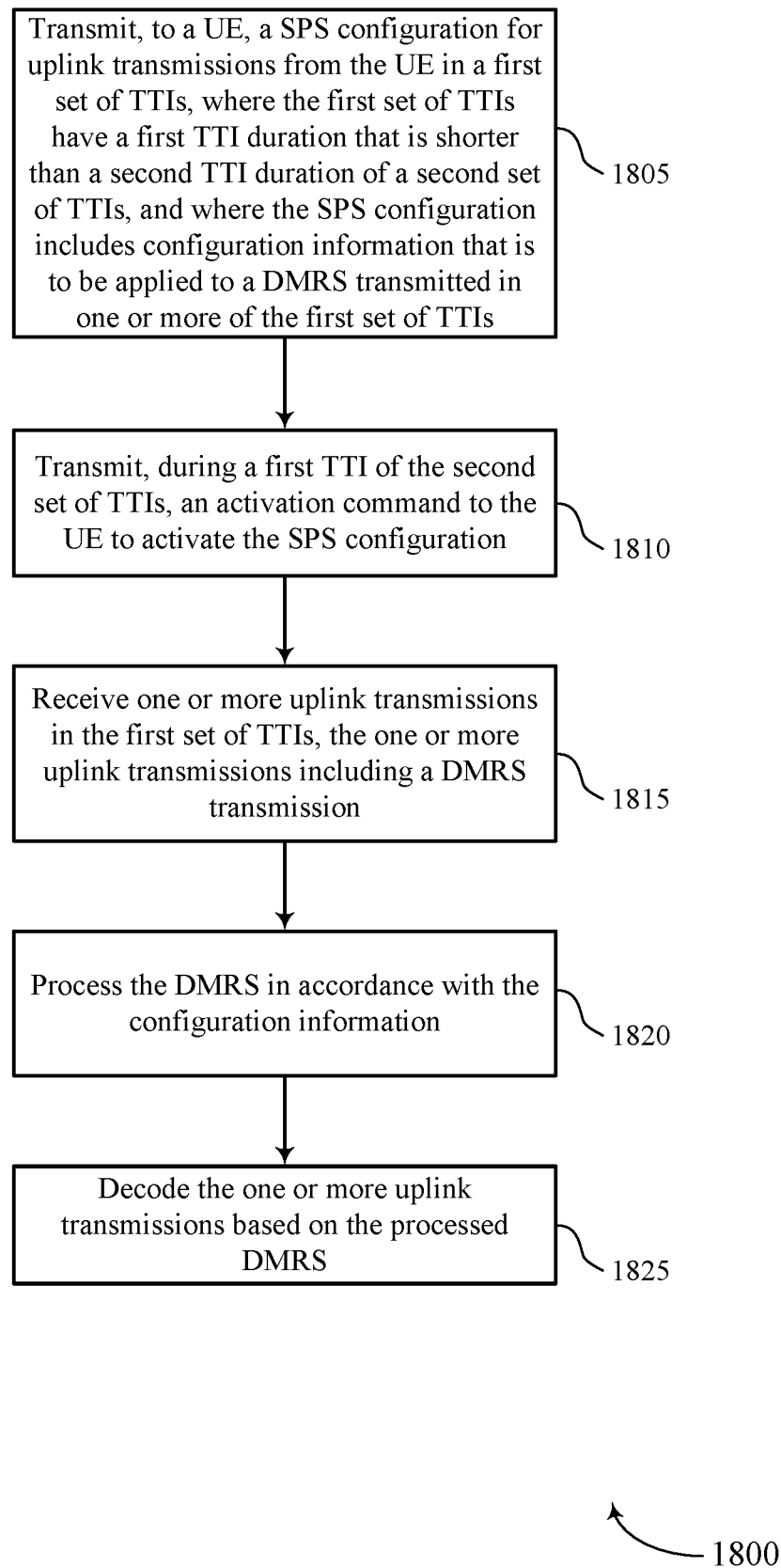

FIG. 18 shows a flowchart illustrating a method 1800 for uplink transmission techniques in low-latency wireless communication in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may transmit, to a UE, an SPS configuration for uplink transmissions from the UE in a first plurality of TTIs, wherein the first plurality of TTIs have a first TTI duration that is shorter than a second TTI duration of a second plurality of TTIs, and wherein the SPS configuration includes a cyclic shift that is to be applied to a DMRS transmitted in one or more of the first plurality of TTIs. The operations of 1805 may be performed according to the methods described herein. In certain examples, aspects of the operations of 1805 may be performed by a SPS manager as described with reference to FIGS. 9 through 12.

At 1810 the base station 105 may transmit, during a first TTI of the second plurality of TTIs, an activation command to the UE to activate the SPS. The operations of 1810 may be performed according to the methods described herein. In certain examples, aspects of the operations of 1810 may be performed by a SPS manager as described with reference to FIGS. 9 through 12.

At 1815 the base station 105 may receive one or more uplink transmissions in the first plurality of TTIs, the one or more uplink transmissions including a DMRS transmission. The operations of 1815 may be performed according to the methods described herein. In certain examples, aspects of the operations of 1815 may be performed by a receiver as described with reference to FIGS. 9 through 12.

At 1820 the base station 105 may process the DMRS in accordance with the configuration information. In some examples, the base station 105 may apply a cyclic shift of the DMRS indicated in the configuration information to do channel estimation and distinguish users. The operations of 1820 may be performed according to the methods described herein. In certain examples, aspects of the operations of 1820 may be performed by a reference signal manager as described with reference to FIGS. 9 through 12.

At 1825 the base station 105 may decode the one or more uplink transmissions based at least in part on the processed DMRS. The operations of 1825 may be performed according to the methods described herein. In certain examples, aspects of the operations of 1825 may be performed by a reference signal manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi) and versions including, but not limited to, 802.11b, 802.11g, 802.11a, 802.11n, 802.11ac, 802.11ad, 802.11ah, 802.11ax, 802.11ay, 802.11ba, etc., IEEE 802.16 (WiMAX), IEEE 802.20, Flash-OFDM, etc., UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication performed by a user equipment (UE), comprising:
    receiving a semi-persistent scheduling (SPS) activation for transmitting uplink SPS transmissions in short transmission time intervals (sTTIs), wherein the sTTIs have a first TTI duration that is shorter than a slot;
    receiving a first uplink power control information for setting a first uplink transmission power for at least a first uplink transmission in the SPS transmissions;
    monitoring, with the SPS activated, a common search space for a power control command;
    modifying SPS power according to the power control command;
    and
    transmitting, after receiving the power control command, an uplink transmission in the SPS transmissions according to the power control command.

2. The method of claim 1, wherein the power control command is included in downlink control information (DCI).

3. A method for wireless communication performed by a network access node, comprising:
    transmitting, to a user equipment (UE), a semi-persistent scheduling (SPS) activation for transmitting uplink SPS transmissions in short transmission time intervals (sTTIs), wherein the sTTIs have a first TTI duration that is shorter than a slot;
    transmitting a first uplink power control information for setting a first uplink transmission power at the UE for at least a first uplink transmission in the SPS transmissions;
    transmitting, with the SPS activated, a power control command in a common search space; and
    receiving, after transmitting the power control command, an uplink transmission in the SPS transmissions according to the power control command.

4. The method of claim 3, wherein the power control command is included in downlink control information (DCI).

5. An apparatus for wireless communication, comprising:
    a processor;
    memory coupled with the processor; and
    instructions stored in the memory and executable by the processor to cause the apparatus to:
        receive a semi-persistent scheduling (SPS) activation for transmitting uplink SPS transmissions in short transmission time intervals (sTTIs), wherein the sTTIs have a first TTI duration that is shorter than a slot;
        receive a first uplink power control information for setting a first uplink transmission power a first uplink transmission in the SPS transmissions, monitor, with the SPS activated, a common search space for a power control command;
        modify SPS power according to the power control command;
        and
        transmit, after receiving the power control command, an uplink transmission in the SPS transmissions according to the power control command.

6. The apparatus of claim 5, wherein the power control command is included in downlink control information (DCI).

7. An apparatus for wireless communication, comprising:
    a processor;
    memory coupled with the processor; and
    instructions stored in the memory and executable by the processor to cause the apparatus to:
        transmit, to a user equipment (UE), a semi-persistent scheduling (SPS) activation for transmitting uplink SPS transmissions in short transmission time intervals (sTTIs), wherein sTTIs have a first TTI duration that is shorter than a slot;

transmit first uplink power control information for setting a first uplink transmission power at the UE for at least a first uplink transmission in the SPS transmissions;
transmit, with the SPS activated, a power control command in a common search space; and
receive, after transmitting the power control command, an uplink transmission in the SPS transmissions according to the power control command.

8. A method for wireless communication performed by a UE, comprising:
receiving a semi-persistent scheduling (SPS) activation for transmitting uplink SPS transmissions in short transmission time intervals (sTTIs), wherein the sTTIs have a first TTI duration that is shorter than a slot;
receiving a first transmit power control (TPC) for the SPS transmissions;
receiving a second TPC for a sTTI transmission scheduled by a downlink control information (DCI) grant;
setting, based at least in part on the first TPC and independent of the second TPC, an uplink power for an uplink transmission of the SPS transmission; and
transmitting the uplink transmission of the SPS transmissions using the uplink power.

* * * * *